(12) United States Patent
Bridge

(10) Patent No.: US 6,880,102 B1
(45) Date of Patent: Apr. 12, 2005

(54) METHOD AND SYSTEM FOR MANAGING STORAGE SYSTEMS CONTAINING MULTIPLE DATA STORAGE DEVICES

(75) Inventor: William Bridge, Alameda, CA (US)

(73) Assignee: Oracle International Corporation, Redwood Shores, CA (US)

(*) Notice: Subject to any disclaimer, the term of this patent is extended or adjusted under 35 U.S.C. 154(b) by 220 days.

(21) Appl. No.: 10/158,757

(22) Filed: May 29, 2002

Related U.S. Application Data

(63) Continuation of application No. 09/178,387, filed on Oct. 23, 1998, now Pat. No. 6,530,035.

(51) Int. Cl.⁷ .................................................. G06F 11/00
(52) U.S. Cl. ............................................. 714/6; 714/718
(58) Field of Search .......................... 714/6, 5, 7, 42, 714/54, 710, 718; 711/113, 114, 165, 166

(56) References Cited

U.S. PATENT DOCUMENTS

| | | | |
|---|---|---|---|
| 5,155,845 A | 10/1992 | Beal et al. | |
| 5,287,459 A | 2/1994 | Gniewek | |
| 5,388,108 A | 2/1995 | DeMoss et al. | |
| 5,524,204 A | 6/1996 | Verdoorn, Jr. | |
| 5,559,764 A | 9/1996 | Chen et al. | |
| 5,574,851 A | 11/1996 | Rathunde | |
| 5,615,352 A | 3/1997 | Jacobson et al. | |
| 5,790,774 A | 8/1998 | Sarkozy | |
| 5,809,224 A * | 9/1998 | Schultz et al. ................. | 714/7 |
| 5,832,526 A * | 11/1998 | Schuyler ...................... | 707/205 |
| 5,862,158 A | 1/1999 | Baylor et al. | |
| 5,875,456 A | 2/1999 | Stallmo et al. | |
| 5,893,919 A | 4/1999 | Sarkozy et al. | |
| 5,974,503 A * | 10/1999 | Venkatesh et al. .......... | 711/114 |
| 5,987,566 A | 11/1999 | Vishlitzky et al. | |
| 6,000,010 A * | 12/1999 | Legg .......................... | 711/114 |
| 6,035,373 A | 3/2000 | Iwata | |
| 6,047,294 A | 4/2000 | Deshayes et al. | |
| 6,058,454 A | 5/2000 | Gerlach et al. | |
| 6,067,199 A | 5/2000 | Blumenau | |
| 6,076,143 A * | 6/2000 | Blumenau .................... | 711/114 |
| 6,078,990 A * | 6/2000 | Frazier ....................... | 711/114 |
| 6,088,766 A * | 7/2000 | Bachmat et al. ............ | 711/114 |
| 6,092,169 A | 7/2000 | Murthy et al. | |
| 6,138,125 A | 10/2000 | DeMoss | |
| 6,195,761 B1 | 2/2001 | Kedem | |
| 6,223,252 B1 | 4/2001 | Bandera et al. | |
| 6,233,696 B1 | 5/2001 | Kedem | |
| 6,405,284 B1 * | 6/2002 | Bridge ........................ | 711/114 |
| 6,530,035 B1 * | 3/2003 | Bridge ........................ | 714/6 |

OTHER PUBLICATIONS

Veritas Software Corp., "Veritas Volume Manager (VxVM) System Administrator's Guide, Release 2.3," Aug. 1996.
Digital Equipment Corp., "Logical Storage Manager," Mar. 1996, http://ccpc5.unican.es/doc/du–40D–doc/AO3NCETE.Title.HTM, printed Nov. 10, 1999, pp. 1–2.

(Continued)

*Primary Examiner*—Dieu-Minh Le
(74) *Attorney, Agent, or Firm*—Hickman Palermo Truong & Becker LLP; Edward A. Becker

(57) ABSTRACT

An approach for efficiently managing logical volumes of data includes subdividing logical volumes of data into relatively small pieces that are spread over several physical disks. When a determination is made that a particular disk drive is to store more than one piece of a volume, a plurality of pieces of the volume are selected to be stored on the particular disk drive based at least in part on how far apart the pieces are within an address space of the volume. In response to an addition of one or more new drives to a system that contains a plurality of disk drives, at least a piece of each of the plurality of volumes may be moved from a drive of the plurality of disk drives to at least one of the one or more new drives.

93 Claims, 21 Drawing Sheets

OTHER PUBLICATIONS

Digital Equipment Corp., "Introduction to the Logical Storage Manager," Mar. 1996, http://ccpc5.unican.es/doc/du–40D–doc/AO3NCETE/DOCU_020.HTM, printed Jul. 15, 1998, pp. 1–23.

Digital Equipment Corp., "LSM Configurations," Mar. 1996, http://ccpc5.unican.es/doc/du–40D–doc/AO3NCETE/DOCU_021.HTM, printed Jul. 15, 1998, pp. 1–12.

Digital Equipment Corp., "Settings up LSM," Mar. 1996, http://ccpc5.unican.es/doc/du–40D–doc/AO3NCETE/DOCU_022.HTM, printed Jul. 15, 1998, pp. 1–11.

Digital Equipment Corp., "Encapsulating Exisiting User Data to LSM Volumes," Mar. 1996, http://ccpc.unican.es/doc/du–40D–doc/AO3NCETE/DOCU_023.HTM, printed Jul. 15, 1998, pp. 1–17.

Digital Equipment Corp., "LSM Root and Swap Disk Mirroring," Mar. 1996, http://ccpc5.unican.es/doc/du–40D–doc/AO3NCETE/DOCU_024.HTM, printed Jul. 15, 1998, pp. 1–8.

Verita Software Corp., Veritas Vol. Manager (VxVM) User's Guide, Release 2.3, 1996.

Digital Equipment Corp., Logical Storage Mangaer, Mar., 1996.

Digital Equipment Corp., Introduction to the Logical Storage Manager, pp. 1–23, Mar. 1996.

Digital Equipment Corp., LSM Configurations, pp. 1–12, Mar. 1996.

Digital Equipment Corp., Setting up LSM, pp. 1–11, Mar. 1996.

Digital Equipment Corp., Encapsulating Existing User Data to LSM volumes, pp. 1–17, Mar. 1996.

* cited by examiner

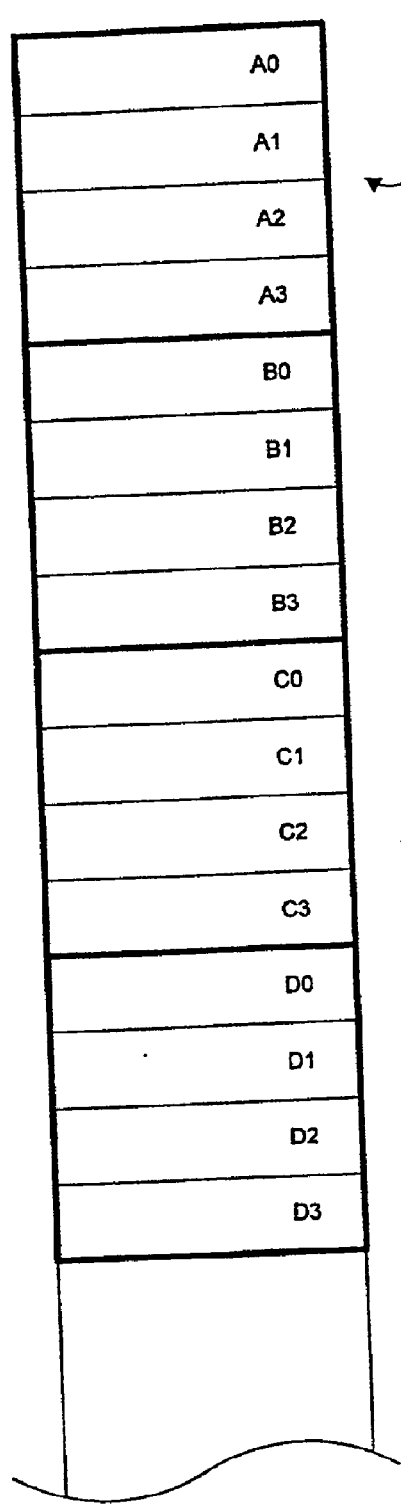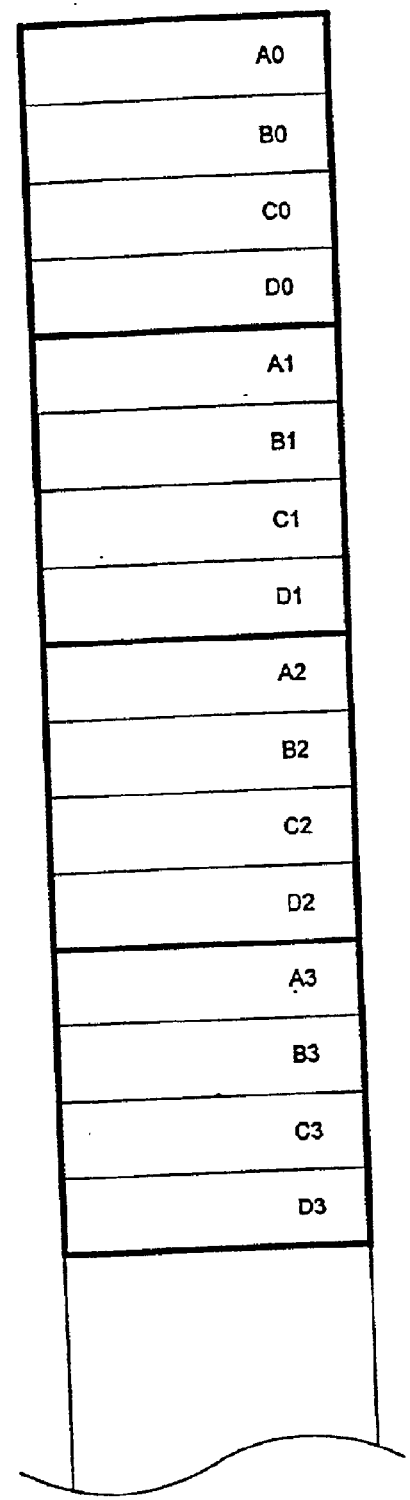
Fig. 2B
Fig. 2C

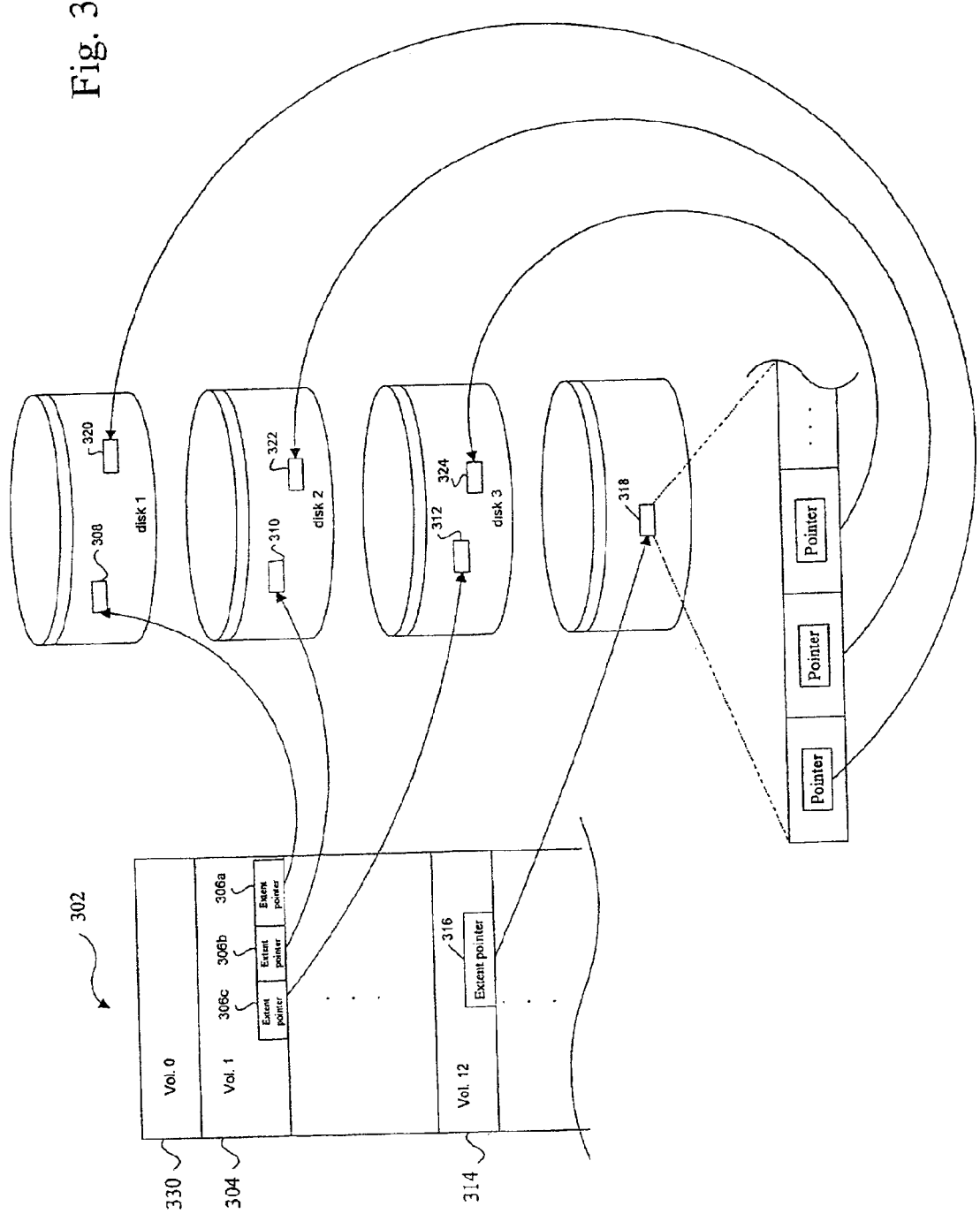

Fig. 7

| Disk Drive | Mirror Partners |
|---|---|
| 602 | 612, 624, 628 |
| 604 | 612, 614, 626, 630 |
| 612 | 602, 604, 624, 630 |
| 614 | 604, 626, 628 |
| 624 | 602, 612 |
| 628 | 602, 614 |
| 626 | 604, 614 |
| 630 | 604, 612 |

METHOD AND SYSTEM FOR MANAGING STORAGE SYSTEMS CONTAINING MULTIPLE DATA STORAGE DEVICES

CLAIM OF PRIORITY; RELATED APPLICATIONS

This application is a continuation of, and claims priority from, U.S. patent application Ser. No. 09/178,387 now U.S. Pat. No. 6,530,035, filed by William Bridge on Oct. 23, 1998, the entire contents of which are incorporated herein for all purposes.

This application is also related to U.S. patent application Ser. No. 09/177,916 now U.S. Pat. No. 6,605,284 filed by William Bridge on Oct. 23, 1998, the entire contents of which are incorporated herein for all purposes.

BACKGROUND OF THE INVENTION

1. Field of the Invention

The present invention relates to storage systems. More particularly, the invention relates to a method and system for managing storage systems containing multiple data storage devices.

2. Background

Conventional data storage systems include one or more storage devices connected to a controller or manager. As used herein, the term "data storage device" refers to any device or apparatus that can be used for the storage of data, e.g., a disk drive. For explanatory purposes only and not as an intent to limit the scope of the invention, the term "disk drive" will be used throughout this document instead of the tern "data storage device."

A logical volume manager (also called a logical disk manager) can be used to manage storage systems containing multiple disk drives. The logical volume manager configures a pool of disk drives into logical volumes (also called logical disks) so that applications and users interface with logical volumes instead of directly accessing physical disk drives. One advantage of using a logical volume manager is that a logical volume may span multiple physical disks, but is accessed transparently as if it were a single disk drive. These logical volumes appear to other components of the computer system as ordinary physical disk drives, but with performance and reliability characteristics that are different from underlying disk drives.

The logical volume manager divides a physical disk drive into one or more partitions (also known as extents or subdisks). Each logical volume is composed of one or more partitions and each partition is typically defined by an offset and length. Because of the overhead inherent in managing multiple partitions, conventional systems normally have severe limitations on the number of partitions that can be formed on a physical disk drive. The practical limit in conventional systems is normally less than 100 (and often less than 10) partitions on a single disk drive. Due to the nature of the data structures and algorithms used by conventional volume managers, the maximum number of partitions or subdisks permitted to a logical volume in conventional systems is usually much less than 5000. In the simplest case, the disk manager forms a logical volume from a single partition. In more complex cases, the disk manager may form logical volumes by concatenating multiple partitions.

Each partition can, and typically does, have a different length. When a logical volume is no longer needed, its partitions are deleted so that space on the disk drives is made available for another partition to be created. However if a new partition is larger than the available space, then the space cannot be reused for the new partition. If the new partition is smaller than the available space, then a portion of the free space will be used and an even smaller piece will remain free. Over time, this results in many small pieces of free space that cannot be reused. This problem is often referred to as "fragmentation."

Traditional approaches to fragmentation problems often introduce other problems into the system. For example, one traditional solution is to move existing partitions together so that the system free space is in one piece. However, this solution could be quite expensive since a significant amount of existing data may have to be moved to place all the partitions together. Moreover, the corresponding data may have to be locked during the move to prevent data inconsistencies from occurring. As a result, this solution could reduce or prevent the availability of data to users during the data move.

Load balancing is another function that should be addressed by the logical volume manager, since the manner in which data is distributed among disk drives may cause load balancing problems. A disk drive can usually service only one I/O request at a time. Requests received at a "busy" disk drive are stored in a queue for later processing, usually in the order received. If one disk drive is accessed more than other disk drives, the queue for accessing data from the busier disk drive becomes longer, and accordingly, the wait also becomes longer. This may result in some disk drives being overloaded while others remain idle or lightly loaded.

Solutions have been proposed to solve this load balancing problem but with limited success. A heavily accessed logical volume may be striped over a number of disk drives to distribute the load. However, the number of partition concatenations to stripe across must typically be chosen when the logical volume is allocated. This requires knowing ahead of time that a set of data is going to be heavily accessed, and presumes that the access pattern will not change over time. Because of changing access patterns, it is usually very difficult to predict optimal striping patterns ahead of time.

Another solution is to gather statistics about the frequency in which different logical volumes are accessed, and then reallocate multiple logical volumes to put less frequently accessed logical volumes on the same physical disk drives as more heavily accessed logical volumes. Logical volumes may also be reallocated to be striped over more disk drives. Deciding how to reallocate, however, is usually a labor intensive administrative task with conventional systems. Once data has been stored, it is normally quite expensive to move that data around. The data is either made unavailable or significant overhead must be incurred to coordinate normal accesses with the movement of the data. In addition, changing the number of disk drives for striping normally requires recopying of the entire logical volume.

A disk drive can be added to a system to increase the amount of available storage. Typically, new data is stored in the new disk drive, rather than moving existing data to be stored in the new disk drive. It may be necessary in some circumstances to add disk drives to support more I/O operations rather than to just provide more storage. However, adding a disk drive for this purpose raises many of the same problems associated with load balancing. For example, when first added, a new disk drive is like a device that has been misconfigured to be idle and needs data from existing logical volumes to be moved to it.

To protect against the loss of information, data on the system can be "mirrored" (i.e., duplicated and stored) on two or more separate storage locations. In this way, an additional copy of data is available for retrieval if the first copy cannot be accessed. However, conventional systems typically provide mirroring at relatively coarse granularity levels. For example, many systems provide mirroring at the granularity of the disk drive, i.e., entire disk drives are mirrored, even if it is desired to mirror only a portion of the data on the disk drive. By implementing mirroring on a disk drive basis, it is not normally possible to mix data with different redundancy requirements on the same disk drive. For example, parity protection can also be used to protect data. In many system, mirroring is more useful for heavily accessed data while parity protection is more useful for less frequently accessed data. In many conventional systems, administrative overhead makes it difficult to configure and protect some of the data with mirroring while protecting other data on the same disk drive with parity protection. Thus, the conventional method of implementing redundancy could create load imbalances.

Protection from disk drive failure can also be achieved by mirroring partitions or concatenations of partitions. Parity protection can also be maintained on a partition basis. To ensure that a disk drive failure does not result in lost data, all partitions in one concatenation should be on disk drives that are not used by other concatenations used for the same logical volume. This requires knowledge about all portions of a logical volume when allocating a new one. This is not a problem for a small number of partitions, but could be present a problem for a logical volume having a large number of partitions.

Conventional redundancy methods also do not adequately address the issue of multiple disk drive failures. If a system contains many logical volumes which spread redundancy data with small allocation granularity over many disk drives, then the chance of two disk drives failing which both contain redundant copies of a particular data item increases. As the partition size decreases, the chances of multiple drive failures that result in lost data increase, since there are more combinations of disk drives protecting redundant copies of the same data.

The foregoing problems of the conventional systems are further exasperated by systems containing many disk drives (e.g., a thousand or more disk drives). This is due in large part to the amount of manual administration required in conventional systems. In conventional systems, the functions of configuring, addressing, and administering logical volumes and disk drives are normally performed manually by an administrator who must make choices as to the proper configuration to employ. When a large number of disk drives and/or logical volumes are used, this manual administration becomes more and more difficult. Thus, existing systems are prone to human error and their structures (administrative and data) do not scale well beyond a certain number of disk drives.

Thus, there is a need for a system and method to address the above described problems of the related art. There is a need for a logical volume manager which can efficiently and effectively address the problems inherent in the prior art with respect to load balancing, fragmentation, and incremental addition of disk drives, particularly in disk systems having a very large number of disk drives.

SUMMARY OF THE INVENTION

Numerous techniques are described herein for efficiently managing logical volumes of data. According to one aspect of the invention, the logical volumes of data are subdivided into relatively small pieces, and spread over several physical disks. According to one aspect of the invention, when it is determined that a particular disk drive is to store more than one piece of a volume, a plurality of pieces of the volume are selected to be stored on the particular disk drive based at least in part on how far apart the pieces are within an address space of the volume.

According to another aspect of the invention, in response to an addition of one or more new drives to a system that contains a plurality of disk drives, the system moves at least a piece of each of the plurality of volumes from a drive of the plurality of disk drives to at least one of the one or more new drives.

According to another aspect of the invention, data is stored within a plurality of logical volumes spread across a plurality of disk drives. For each volume of the plurality of logical volumes, a list of entries is maintained. Each entry in the list of entries corresponds to a logical volume piece and identifies a disk drive piece that stores the corresponding logical volume piece. The list of entries for a particular logical volume is used to translate logical volume I/O requests into physical disk drive I/O requests.

According to another aspect of the invention, a logical volume directory is maintained that includes a directory entry for each volume of the plurality of logical volumes. In the directory entry for a first logical volume, one or more extent pointers are stored for locating data extents that belong to the first logical volume.

BRIEF DESCRIPTION OF THE DRAWINGS

The accompanying drawings are included to provide a further understanding of the invention and, together with the Detailed Description, serve to explain the principles of the invention.

FIGS. 2A, 2B, and 2C are diagrams illustrating extent striping in an embodiment of the invention.

FIG. 3 is a diagram showing a logical volume directory according to an embodiment of the present invention.

FIG. 7 is a table describing mirror partners for disk drives shown in FIG. 6.

DETAILED DESCRIPTION

System Overview

Figure 1:
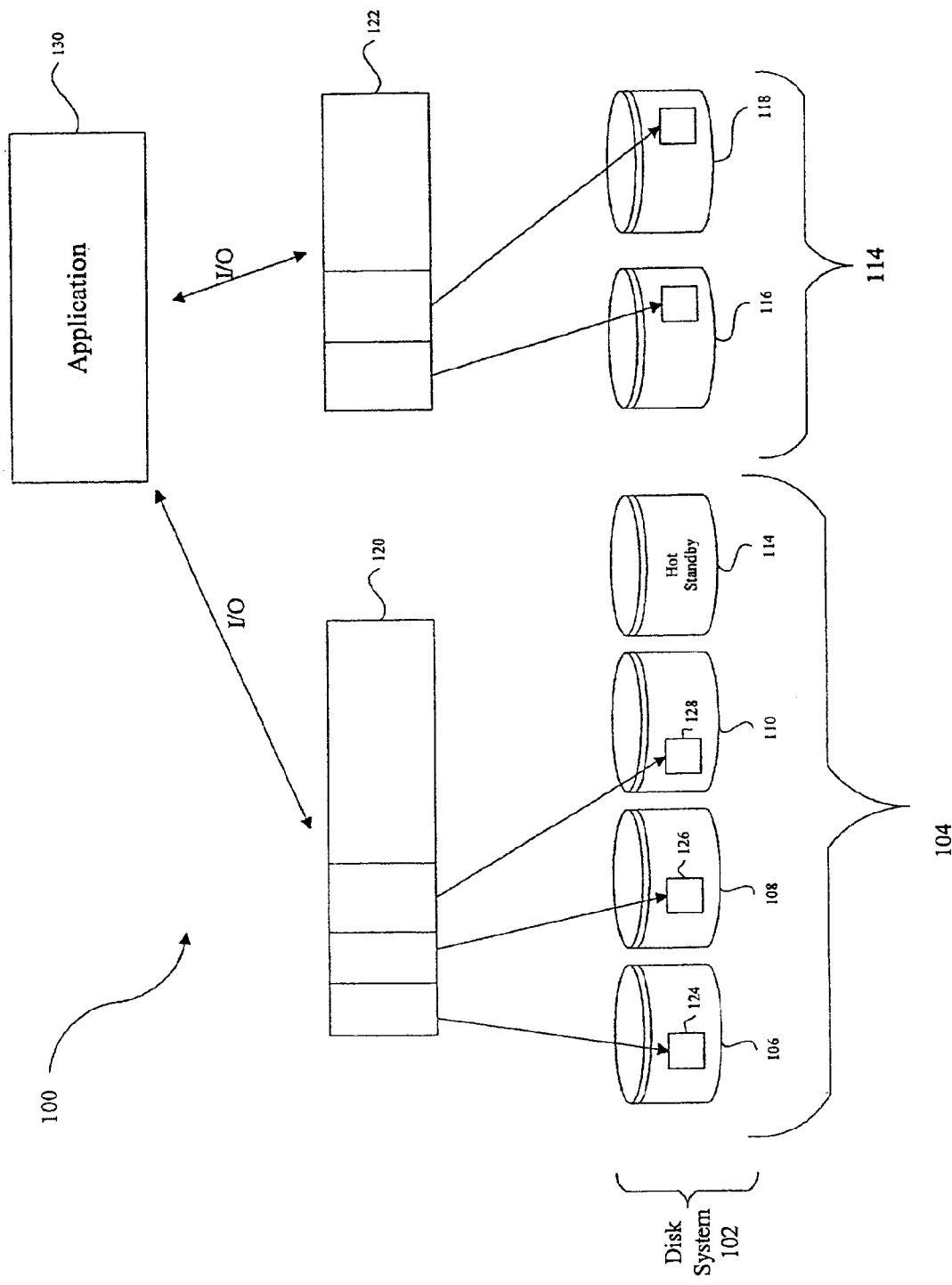
FIG. 1 illustrates a storage system according to an embodiment of the present invention.

Techniques are provided for managing and allocating logical disks or logical volumes on an array of disk drives. In one embodiment, each disk drive is divided into many small fixed size pieces, where the size of the piece is small compared to the size of the disk drive. Allocations and deallocations of storage space are normally performed in units of the size of the piece. Fragmentation is reduced or eliminated because all pieces are the same size. If desired, a power of two pieces can be allocated at a power of two boundary of the disk drive. These multiple piece allocations are also reusable for identical allocations or smaller allocations. Even multiple piece allocations are small compared to the size of a disk drive.

Each logical volume is made of pieces from many disk drives. The logical volume can be composed of pieces from many or all disk drives. The pieces of a logical volume are spread out as evenly as practical such that two pieces on the same disk drive are far apart in the address space of a logical volume. Thus, I/O load is spread evenly over multiple disk drives. The address space of the logical volume can be striped across small groups of pieces to improve throughput for large I/O operations.

If a disk drive is added to the system, pieces from all logical volumes can be migrated to the new device. Since each piece is small it can be locked briefly while being copied with little impact on availability. Since each piece can be moved independently of any other pieces, there is no need to restripe entire logical volumes. The migration can be done gradually at low priority to limit the impact on overall system performance. As the migration proceeds the new device gradually increases its contribution to the overall I/O load of the system. If a disk drive needs to be removed, its pieces can be gradually migrated to other disk drives. The migration can be performed dynamically or automatically once the system recognizes that a hardware change has occurred or will occur to the system configuration, such as the addition or removal of a disk drive. In one embodiment, other system configuration changes, such as the occurrence of disk drive I/O load imbalance, may dynamically trigger the migration of pieces to and from certain disk drives.

Unlike systems that employ traditional data striping, if the data migrations are triggered by a hardware configuration change, then the amount of data to be migrated is proportional to the change in storage capacity of the storage system. For example, if the storage system comprises 1000 disk drives, then the addition of a new disk drive to the storage system results in the migration of a quantity of data that totals enough to fill approximately one disk drive. If redundancy methods such as mirroring are employed, then the amount of data to be moved can be proportionately increased.)

Each logical volume is described by a list of its pieces. Each entry in the list gives the disk drive and the piece within the disk drive for one piece of the logical volume. The list itself may be stored in one or more pieces from one or more disk drives. The list forms an array ordered by the logical volume address so that it is easy to find the piece on the physical disk drive corresponding to a logical volume piece. These lists are used to translate logical volume requests into physical disk drive I/O requests. Each disk drive contains an allocation table with one entry for each of its pieces. The allocation table describes the parameters of each of the pieces on the disk drive.

An aspect of the invention relates to a method of allocating redundant data on disk drives. Redundancy methods may include, for example, data mirroring and the use of parity protection. Redundant data is normally placed so that failure of a single disk drive will not result in the loss of data. However, multiple disk drive failures may cause loss of data if the disk drive failures affect the exact disk drives that contain the redundant sets of data. Using the techniques described herein, failure of multiple disk drives is unlikely to lose any data even when logical volumes are allocated from a large number of disk drives with small allocation granularity. Moreover, choice of disk drive for redundant data is independent of any other allocations for the same logical volume. Thus the algorithm scales for large logical volumes and many disk drives even with small allocation granularity.

In the present embodiment, each disk drive is associated with a failure group. Two disk drives are in different failure groups if they do not share a common failure condition that is projected to affect both disk drives at the same time, e.g., they are not dependant upon a common piece of hardware which can fail without the entire system failing. Two disk drives are in the same failure group if they can both become inaccessible due to a single failure, which the system should survive. There should be at least two failure groups for the system to survive a failure.

For mirroring, each disk drive is paired with one or more disk drives from other failure groups. These symmetric pairs are called "mirror partners." In the present embodiment, partnerships are formed so that every disk drive has mirror partners in as many different failure groups as possible. When a piece of a logical volume is allocated on a disk drive, the mirror copy of that piece is allocated on one of the disk drive's mirror partners. The partner is chosen to evenly distribute the mirrored data to all partners of a particular disk drive. Two independent failures would be required to destroy both copies of the data. The chance of losing data because of double drive failure depends primarily on the number of mirror partners per disk drive rather than the number of disk drives containing pieces of the same logical volume. Using the techniques described herein, if a double failure occurs that results in the loss of data, then the amount of data that is lost is significantly reduced since it is only the portion shared by the two failed disk drives that is lost. This is in contrast to conventional systems that mirror entire disk drives, where a double failure of mirrored disk drives results in the loss of data from an entire disk drive.

Mirroring pieces of logical volumes rather than entire disk drives or logical volumes allow better load distribution after a failure, and allow mirrored and non-mirrored data to reside on the same disk drive. When there are multiple mirror partners, then there are multiple disk drives to take over the load of a failed disk drive. The I/O necessary to rebuild the replacement disk drive comes from multiple surviving disk drives. This improves I/O load balancing and the mean time to repair using a hot standby. In the present embodiment, the choice to mirror or not is independent of the particular disk drive chosen to store the data. There is no requirement to choose a fixed partitioning of storage into mirrored and non-mirrored storage areas. As system requirements change, the amount of mirrored data can be dynamically adjusted without administrative commands.

The method can be generalized to other redundancy algorithms such as parity protection. When parity protection is employed, the contents of a lost data piece can be recalculated from the parity piece and the remaining data pieces. In an embodiment, the parity piece contains the exclusive OR of all of the data pieces corresponding to a particular parity set. According to one embodiment, the parity piece is allocated on a disk drive chosen to spread the data evenly across all system disk drives. The data pieces are then allocated from disk drives in different failure groups which are mirror partners of the disk drive containing the parity piece. Thus, both the number of failure groups in a system and the number of mirror partners sets an upper bound on the number of data pieces that can be protected by one parity piece.

Disk Structures

Referring to FIG. 1, shown is a storage system 100 having a disk system 102 according to an embodiment of the present invention. Disk system 102 comprises one or more "disk groups." A disk group is a set of disk drives that have similar characteristics. In the illustrated example of FIG. 1, disk group 104 is comprised of physical disk drives 106, 108, 110, and 112 while disk group 114 is comprised of disk drives 116 and 118. Multiple disk groups can exist for assigning space for different purposes and for providing different performance characteristics. Most disk drives within a disk group are used for allocating data storage space, while some are designated as "hot standby drives." A hot standby drive is a disk drive that is defined and recognized by the system, but is not immediately made available for data storage. Such a disk drive is normally associated with a specific disk group and is used to replace failed disk drives in the disk group.

A "root disk group" can be used to store information describing the entire disk system. The root disk group information identifies all directories that are used to maintain the disk system. In addition, it contains information about logical volumes, disk groups, and physical disk drives in disk system 102. Disk headers in the root disk group contain addresses of logical volume directories.

Each disk drive in disk system 102 is a named disk drive. A named disk drive is a single physical disk drive from the point of view of the operating system, although the named disk drive may actually be a group of disk drives in a storage subsystem that appear as a single disk drive on the I/O bus. When a disk drive is added to the disk system 102, it is given a name (in an embodiment, the disk name is assigned by the system administrator). This name is stored on the disk drive itself and is used to identify the disk drive when the system is booted. Operationally, the name is also used in interactions with the systems administrator. Statistics can also be maintained by disk drive names. Failures can be reported by disk drive names, while disk drives are dropped by name. A disk group should contain multiple named disk drives. The beginning of a disk drive contains a map of the space on the disk drive. This map defines which portions of the disk drive are free and which logical volumes the allocated portions belong to.

Each named disk drive has a physical block size, which is preferably a power of two. This is the block size that was used to format the disk drive. I/O requests to a named disk drive should be a multiple of the physical block size. In a present embodiment, all disk drives in a disk group have the same physical block size.

A logical volume is the basis of the storage interface presented to a client application 130 of storage system 100. FIG. 1 shows two logical volumes 120 and 122. Each logical volume appears to client application 130 as a contiguous section of storage, although the logical volume may actually span non-continuous space across a very large number of physical disk drives. Logical volumes may be created, destroyed, resized, read, and written. In an embodiment, a logical volume is allocated within a single disk group. Thus, logical volume 120 is allocated within disk group 104 while logical volume 122 is allocated within disk group 114. A logical volume can be spread over many or all of the disk drives in a disk group. Using the techniques described herein, the system can move parts of a logical volume while it is in active use. A logical volume id consists of a logical volume number and an incarnation for that logical volume number. The logical volume id is unique within the entire disk system. A directory system can be used to associate ASCII names with a logical volume id.

Once created, the logical volume can be directly accessed as a single large logical file, e.g., as a database file used by database management systems such as Oracle 8 from Oracle Corporation. In addition, the logical volume can be utilized much like a Unix partition, in which the logical volume is formed into a file system. If used as a file system, multiple OS based files can be formed and allocated from the logical volume.

The data in a logical volume is composed of multiple data extents. Each data extent is a contiguous section of storage on a named drive. As shown in FIG. 1, the first three extents of logical volume 120 correspond to data extents 124, 126, and 128 on disk drives 106, 108, and 110 respectively. Extents for a logical volume may be located on a single named drive, or may be spread across multiple disk drives. Spreading logical volumes over multiple disk drives provides load balancing advantages, as will be explained in more detail below.

The size of data extents is selected for desired performance characteristics. Extents should be large enough to support efficient sequential I/O. When moving data, larger data extents result in more data being locked for a longer time, whereas smaller extents result in more overhead spent to perform the locking. Larger extent sizes reduce the number of pointers that must be maintained to track all the extents of a logical volume. Smaller extent sizes allow a logical volume to be spread more evenly over more disk drives. In a present embodiment, each data extent for a particular logical volume is preferably of a fixed size. According to one embodiment, a logical volume is large enough to comprise over 5000 data extents, and may well exceed several tens/hundreds of thousands or millions of data extents.

One advantage of the techniques described herein is that, unlike the prior solutions, each logical volume is composed of a large number of data extents and each data extent is formed of a relatively small size. The present system can move data from one disk drive to another by locking an extent for I/O and then copying it. Because of the relatively small size of the data extents, smaller sections of data are locked to perform data movements from one disk drive to another, thereby preserving greater concurrency and data access for system clients. If a new disk drive is added, extents from all logical volumes can be migrated to the new device. Since each extent is small, it can be locked briefly while being copied with little impact on availability. Since each extent can normally be moved independently of any other extent, there is no need to restripe entire logical volumes. The migration can be done gradually at low priority to limit the impact on the overall system performance. As the migration proceeds the new device gradually increases its contribution to the overall I/O load of the system. If a disk drive needs to be removed, its pieces can be gradually migrated to other disk drives.

In a present embodiment, each logical volume is made of extents from as many disk drives as possible. The logical volume may contain extents from every drive, but this may not be possible if there are too many drives or if some are full. The extents of a logical volume are spread out as evenly as is practical so that two extents on the same disk drive are far apart in the address space of the logical volume. Thus, the I/O load is spread evenly over many or all disk drives. The address space of the logical volume can be striped across small groups of extents to improve throughput for large I/O operations.

Each physical disk drive is divided into many fixed sized storage pieces. In the present embodiment, each of these pieces is referred to as an "allocation unit," which has a size that is preferably a power of 2 multiple of the disk drive block size. Disk space within a disk group is normally allocated and freed in pieces of the allocation unit size. Thus, the size of a data extent for a logical volume is preferably a power of two multiple of the allocation unit for the disk group. The usable space in a disk drive will typically be a multiple of this size.

The size of allocation units is selected for desired performance characteristics. One factor to consider in this selection is the I/O performance of the disk drive(s) containing the allocation units. In one embodiment, the allocation unit size is selected so that it is large enough such that an I/O of the entire allocation unit is near the maximum efficiency of the disk drive, but is small enough so that it can be transferred in an I/O which does not significantly impact the availability of the disk drive. Random I/O operations of the preferred allocation unit size will result in a transfer rate of at least 50%, and more preferably at least 75% of the maximum transfer rate of the disk drive. The allocation unit size can be selected such that it is small compared to the amount of memory available for caching disk drive blocks so that caching will average I/O loads over areas of logical volumes much larger than an allocation unit. An allocation unit should be large enough such that the data to keep track of its status is insignificant compared to the data in the allocation unit. Since each logical volume is an integral number of allocation units, each allocation unit should be small compared to the size of a logical volume to avoid wasting space in a partially used allocation unit. In an embodiment, the allocation unit comprises at least two or more disk blocks in size.

In an embodiment, a small hot spot will not result in excessive disk drive I/O operations to that location because a cache will retain hot blocks to avoid excessive disk drive I/O. However, entire logical volumes may be too large to fit in the cache. In conventional systems, this may cause load imbalances in the system. However, using the techniques described herein, a logical volume that is hot will have disk drive I/O distributed to all areas of the logical volume rather than to a single disk drive. Larger allocation units save directory space and make for more efficient space maintenance operations. Smaller allocation units waste less space due to partially filled units, and allow more logical volumes to share a disk drive for better load balancing. In an embodiment, a disk drive comprises at least 10,000 allocation units. Thus for a 4 gigabyte disk drive in an embodiment of the invention, an allocation unit could be somewhere between 128K and one megabyte in size.

The use of allocation units allows for the reduction or elimination of fragmentation in the system. Using the techniques described herein, many relatively small extents comprised of one or more allocation units are allocated on each disk drive. Extents can be allocated along boundaries that correspond to the number of allocation units within an allocated extent. For example, extents that are a power of two allocation units in size can be allocated at corresponding power of two boundaries of the disk drive. Allocating to these boundaries facilitates the re-allocation of particular areas of the disk drive once sets of allocation units have been de-allocated, since sections of the disk drive that have been de-allocated are inherently of the proper size for reallocation. By allocating many relatively small extents, and allocating along boundaries based upon the number of allocation units being allocated, fragmentation can be minimized or eliminated in the system.

Breaking a logical volume into many extents on many different disk drives provides load balancing, but does not necessarily improve throughput. In an embodiment, it is expected that most I/O operations are no more than one extent long. For situations where performance demands require more throughput than one disk drive can provide, extent striping can be used. A common case for this is a database log file.

Extent striping remaps the address space of a logical volume so that it is no longer a straight concatenation of all data extents in the logical volume. A stripe factor and stripe unit is chosen to perform extent striping. Stripe factor refers to the number of disk drives employed for striping, while stripe unit refers to the size of the data piece written to each disk drive during each pass of the striping operation. In a present embodiment, the stripe unit is a power of two times the physical block size and is less than the data extent size. A logical volume should be an integral multiple of stripe factor extents. Picking too large a stripe factor may waste space and makes allocation difficult since each extent should be on a different disk drive. A too small stripe unit may reduce the efficiency of I/O operations. A too large stripe unit may not improve throughput for all but the largest I/O operations.

Figure 2A:
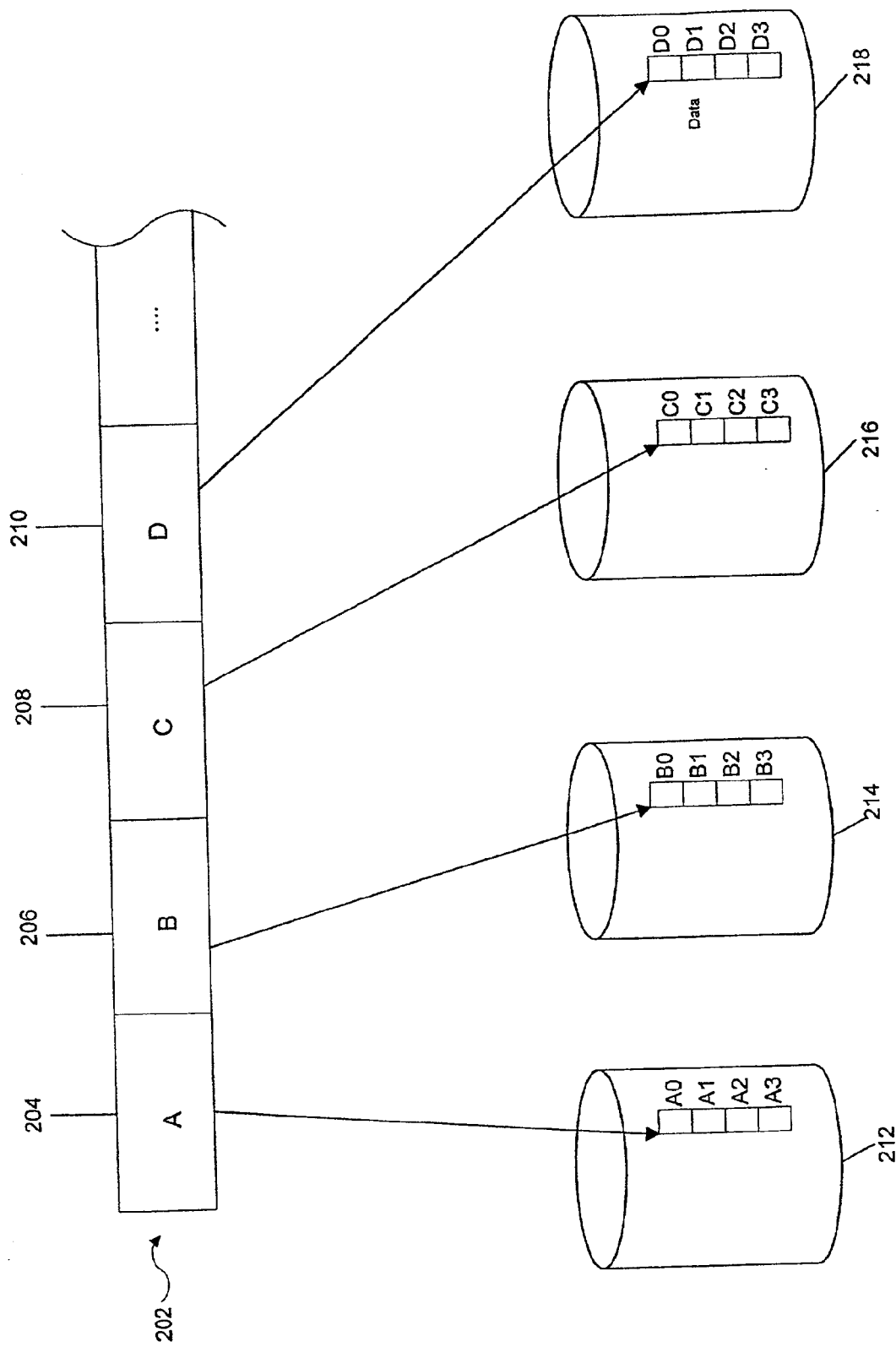

Referring to FIG. 2A, shown is a logical volume 202 comprised of data extents, A, B, C, and D. Data extents A, B, C, and D are located on disk drives 212, 214, 216, and 218 respectively. If striping is employed, then extent A can be divided into a plurality of stripe units, such as stripe units AØ, A1, A2, and A3. Extent B could be divided into stripe units BØ, B1, B2 and B3. Similarly, extents C and D could be divided into stripe units CØ, C1, C2, C3, and DØ, D1, D2, D3 respectively.

FIG. 2B illustrates the address space of logical volume 202 when striping is not used. When data striping is not used the logical address space sequentially proceeds in order through the data extents comprising logical volume 202. Thus, a sequential read of the contents of logical volumes 202 will result in the access of extent A on disk drive 212, then proceed to an access of extent B on disk drive 214, and thereafter proceed in order through extents C and D on disk drives 216 and 218. Note that during an extent-sized access of disk drive 212 (i.e., disk access that is one extent in length), disk drives 214, 216, and 218 remain idle. In fact, this scheme causes I/O to occur at each disk drive in sequence, while leaving other disk drives idle during the I/O operation.

FIG. 2C shows a striped logical volume address space for logical volume 202 when striping is used. The address space of logical volume 202 is divided such that the addresses for the striped units of data are interlaced up to the stripe factor value. FIG. 2C shows a system having a stripe factor of four and a strip unit size such that each extent is divided into four stripe units. When an extent-sized sequential read of logical volume 202 is performed according to the striped system of FIG. 2C, parallel I/O operations are performed against each of disk drives 212, 214, 216, and 218. Specifically, a first set of I/O operations will access stripe units AØ, BØ, CØ, and DØ in parallel. Then, stripe units A1, B1, C1, and D1 are accessed in parallel. Thereafter, stripe units A2, B2, C2, and D2 and A3, B3, C3, and D3 are also accessed in parallel. Thus, parallel I/O is performed against multiple disk drives, rather than I/O against a single disk drive at a time as is the case with the example of FIG. 2B. Thus, data striping can be used to increase I/O throughput.

In an embodiment, each logical volume is defined by a list or directory that identifies each logical volume's parameters and extents. FIG. 3 shows one embodiment of such a directory, which is termed a "logical volume directory" 302. The directory itself can be a logical volume that is stored in one or more extents from one or more disk drives. This directory is used to translate logical I/O requests into disk drive I/O requests.

Referring to FIG. 3, logical volume directory 302 contains one entry for every logical volume in the disk system. Each entry contains information about the logical volume such as, for example, its size, striping factor, stripe unit, allocation, disk group, extent size, and redundancy algorithm. The logical volume directory entry also contains one or more extent pointers.

If the logical volume is small enough, extent pointers within the directory entry point directly to the data extents of the logical volume. For example, directory entry 304 for logical volume 1 contains a number of extent pointers 306a, 306b, and 306c. Extent pointer 306a points to data extent 308 on disk 1, extent pointer 306b points to data extent 310 on disk 2, and extent pointer 306c points to data extent 312 on disk 3.

If a logical volume is large enough such that the logical volume directory entry does not have enough pointers to directly point to all the corresponding data extents, then the pointers in the directory entry point to pointer extents, which in turn point to the data extents for that logical volume. Pointer extents are analogous to data extents, but contain pointers to data extents instead of data. In the example of FIG. 3, directory entry 314 for logical volume 12 contains an extent pointer 316 which points to a pointer extent 318. Pointer extent 318 points to data extents 320, 322, and 324 on disks 1, 2, and 3 respectively. Depending upon the size of the logical volume, most logical volumes will need only one pointer extent to point to all the data extents of a logical volume. Large logical volumes might need multiple pointer extents. An additional level of pointer extents pointing to pointer extents should not be necessary in most cases since one level of pointers in a present embodiment can support logical volumes that are over 100 terabytes in size; however, it is expressly contemplated that the techniques described herein can be applied to systems having multiple levels of pointer extents.

Pointer extents can be in a different disk group from data extents. This is useful for cases where one disk group has different performance characteristics than another. A disk group with poor performance for small updates would not normally be chosen for pointer extents, which may need to be updated when relocating an extent. However it would be suitable for read only data extents. As with data extents, pointer extents are preferably a power of two multiple of the allocation unit for the disk group where they reside. The size of a pointer extent can be different than the size of data extents for a logical volume. Since pointer extents are a small portion of the overall system data and are important for maintaining space, pointer extents should be mirrored.

In an embodiment, the logical volume directory is itself a logical volume. The first entry 330 in the logical volume directory 302 is the logical volume directory itself. A logical volume's number, is an index into the logical volume directory to the entry for that logical volume. Thus the logical volume directory is logical volume zero. To detect stale logical volume numbers, a logical volume can also be identified by a 32-bit timestamp from the time of its creation or modification. The logical volume number and timestamp together can be used to form the logical volume id.

The logical volume directory contains information for interpreting the contents of logical volumes. Thus the logical volume directory should be mirrored, and possibly even triple mirrored on some systems. The address of each copy of the first data extent of the logical volume directory is recorded in the header of every disk drive in the root disk group. Since the first data extent starts with the directory entry for the logical volume directory, this makes it possible to find all logical volumes.

Figure 4:
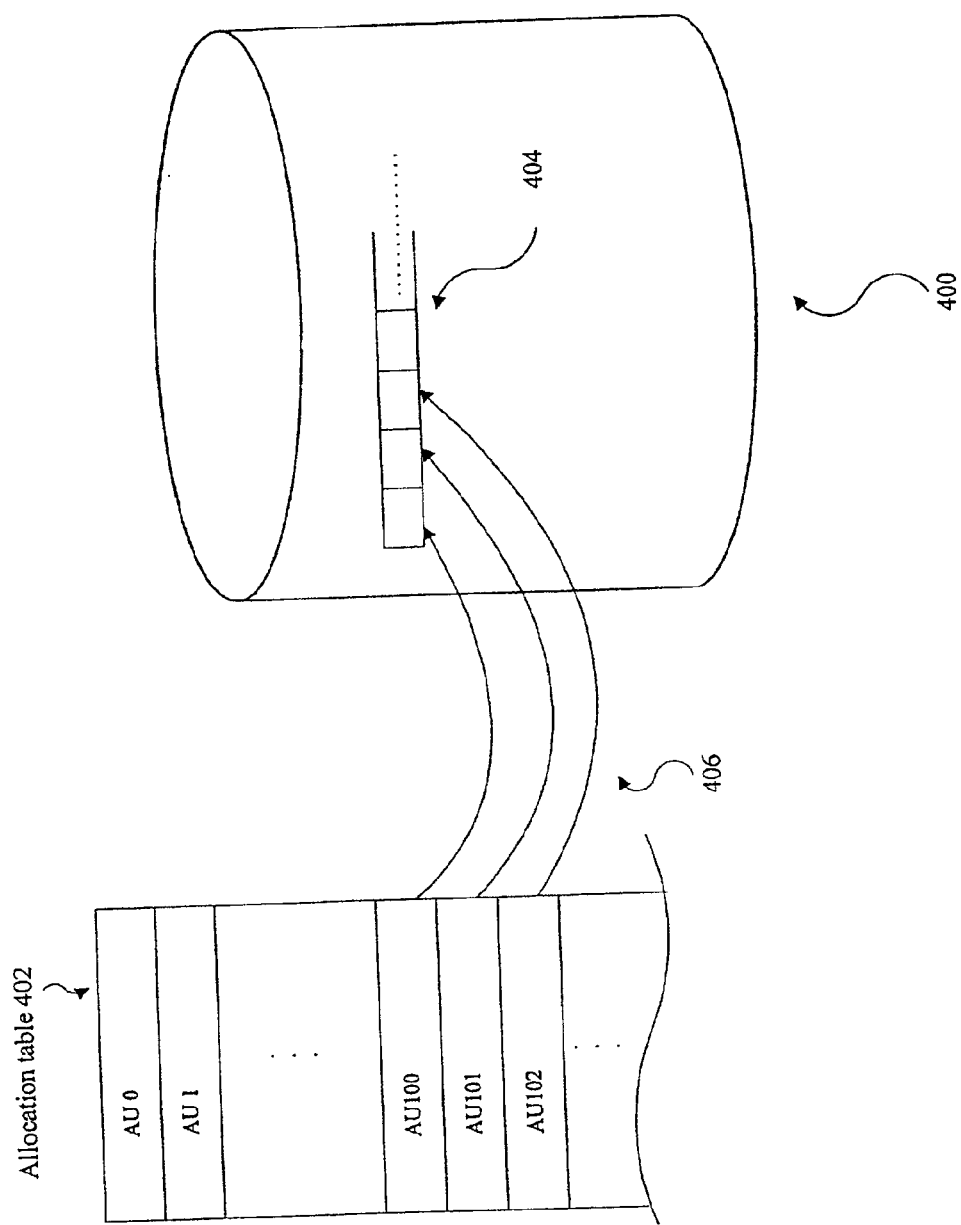
FIG. 4 is a diagram of an allocation table according to an embodiment of the invention.

In an embodiment, a separate list is maintained for each disk drive with entries that describe each allocation unit on that disk drive. The example of FIG. 4 illustrates one embodiment of this list, which is referred to as an "allocation table" 402. If an allocation unit is not part of any logical volume, its entry will indicate that the allocation unit is available. If an allocation unit contains data for a logical volume, then the table entry describes the logical volume and the address within the logical volume. If an allocation unit contains pointers for a logical volume, then the table entry identifies the logical volume and the corresponding pointer extent for that logical volume.

Referring to FIG. 4, the beginning of a disk drive 400 is preferably an allocation table 402 that describes the contents of the disk drive. Allocation table 402 has one entry for every allocation unit 404 on the disk drive. If allocation unit 404 is allocated to a logical volume, then the entry in allocation table 402 identifies the corresponding logical volume and extent within the logical volume. If an extent spans multiple allocation units then there will be multiple entries that are the same. An entry of zero indicates available storage. In an embodiment, the position of an entry in the allocation table corresponds to the allocation unit position on disk drive. Thus, the allocation table 402 does not need to maintain pointers to the allocation units on disk drive. Alternately, the allocation table may maintain pointers 406 to the allocation units 404 on the disk drive.

The logical volume directory 302 and allocation tables 402 contain the same information in different forms. If a disk drive fails, the surviving allocation tables can be used to reconstruct any pointer extent on the failed device containing entries for allocation units on surviving devices. To accomplish this, the allocation tables for the surviving disk drives can be scanned to identify and rebuild any pointer extents that were on the lost disk drive. If a failure corrupts one of the data structures, the other can be used to repair the corruption. Thus, allocation table 402 contains enough information to rebuild all the pointers to data extents on disk drive 400. If another disk drive failed and that disk drive contained pointer extents that pointed to disk drive 400, then lost pointer extents could be rebuilt from the allocation tables.

Allocation table 402 does not ordinarily have to be mirrored since it only describes the disk drive it is stored on.

If an allocation table becomes corrupted it is possible to reconstruct the lost entries by scanning pointer extents for all logical volumes in the disk group.

An embodiment of the present invention includes a named disk directory, which contains information about every named disk drive known to the disk system. Most of this information is replicated in the header of the disk drive. However, the named disk directory also contains status information that may not be on the disk drive. For example, if a disk drive failure has occurred, then this information is recorded in the named disk directory (but may not be recorded to the disk drive itself). In addition, the named disk directory also identifies mirror partners for each disk drive (mirror partnerships will be described in more detail below).

If a named disk directory is utilized, then it is assigned to logical volume number one, and can be found from the first extent of the logical volume directory. The block number within the directory is the disk number. A version number can be used to recognize old named disks that had the same number. As with the logical volume directory, the named disk directory should be mirrored for protection from disk drive failure. If the named disk directory becomes corrupt, it can be rebuilt from information replicated in the disk drive headers.

A particular embodiment of this invention also includes a disk group directory. The disk group directory contains one entry for each disk group. The disk group directory describes characteristics that are common to each disk drive in the disk group. This can include, for example, the allocation unit size, the limit on mirror partners, and the physical block size. As with the logical volume directory the disk group directory should be mirrored to protect it from disk drive failure. If the disk group directory becomes corrupt, it can be rebuilt from the disk drive headers.

A present embodiment includes an "active change directory" to preserve data consistency for operations that modify the system. When it is necessary to make a structural change to the storage system, an entry is allocated in the active change directory to track the operation and ensure that the operation either completes or is undone. If a process dies without marking the change entry as complete, then a recovery process will look at the entry, and complete or undo the operation. Thus, the active change directly is somewhat analogous to the "undo log" employed in database systems. As with the logical volume directory the active change directory is preferably mirrored to protect it from disk drive failure.

For example, deleting a logical volume may require updating many disk drives to indicate that allocation units of the logical volume are free, as well as marking the entry in the logical volume directory. The first step in deleting a logical volume is to write an active change directory entry indicating that a logical volume is being deleted. After updating all the allocation tables and the logical volume directory, the entry in the active change directory is marked as complete. Similarly, creating a logical volume makes an identical entry so that a failure during creation will result in the partially created logical volume being deleted.

Redundancy Methods

To protect against the loss of information in the event of a disk drive failure, redundancy methods can be employed to ensure continued access to data. Two methods that are particularly applicable are mirroring and the use of parity protection. Mirroring involves the replication of data at two or more separate and distinct disk drives. Parity protection can be used to recalculate lost information from existing data.

Figure 5:
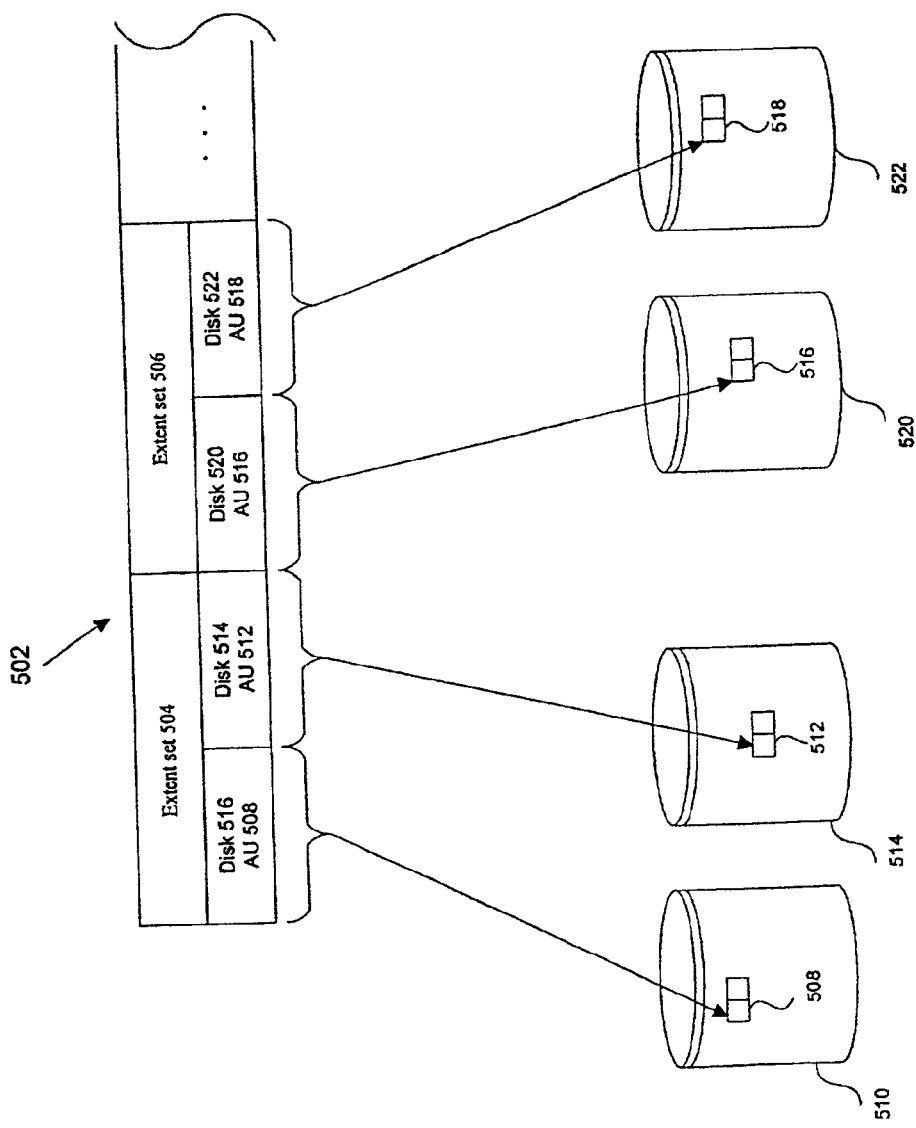
FIG. 5 is a diagram showing extent mirroring according to the present invention.

Referring to FIG. 5, extent mirroring can be used to maintain two copies of each extent for a logical volume. Update operations to the extent are written to both copies, and read operations can be performed against either extent. In a preferred embodiment, mirroring of pointer extents can be independent of mirroring for data extents. Extent mirroring can be used to protect against the loss of a disk drive. Striping can be done on top of mirroring to increase throughput.

In the example of FIG. 5, logical volume 502 employs extent mirroring to maintain two copies of every data extent. The group of extents that contain mirror or redundant copies of a particular data item is referred to an "extent set." In FIG. 5, logical volume 502 includes extent sets 504 and 506. Extent set 504 points to two mirrored copies of a data extent that is two allocation units in size. One mirrored copy is stored as extent 508 on disk drive 510, while the other mirrored copy is stored as extent 512 on disk drive 514. Similarly, extent set 506 comprises two mirrored data extents 516 and 518 which are located on disk drives 520 and 522 respectively.

A dual-mirrored extent requires two pointers be maintained for every mirrored extent. For very critical data it is also possible to maintain more than 2 mirrored copies of a data extent—this additional mirroring can be achieved by expanding the extent set to include pointers to other mirrored copies of the data extent.

Extent mirroring is more flexible than mirroring entire disk drives since it allows the redundancy to be specified on a per logical volume basis. It allows dynamic determination of how much data is to be mirrored on a disk drive. Thus, multiple logical volumes can share the same disk drive, with some logical volumes being mirrored while the others are not. Extent mirroring also allows multiple disk drives to share in the increased I/O load that is incurred when a disk drive fails. Mirroring can also be performed at granularities smaller than the logical volume level. In an embodiment, the logical volume directory entry is configured to indicate whether mirroring is used for a particular extent, and if so, the amount of mirroring that is applied. To accomplish this, variable sized extent sets are employed. Each extent set within a logical volume can have different mirroring characteristics from other extent sets in the same logical volume. Extents which are mirrored contain multiple extent pointers within the extent set. Extents that are not mirrored have only a single extent pointer per extent. Thus, it is possible to designate only certain selected extents within a logical volume to be mirrored.

An alternative to mirroring is to utilize parity protection by keeping a parity extent for every few data extents. A group of data extents protected by a parity extent is called a parity set. The parity extent preferably contains the exclusive OR of all the corresponding data extents. If one of the extents within a parity set is lost due to a disk drive failure, its contents can be recalculated from other extents in its parity set.

In an embodiment, a parity set size is selected for a logical volume. Each logical volume can have a different parity set size. The data in the logical volume is sized to be a multiple of the parity set size. The parity set size is selected for desired performance characteristics. Large parity sets could make updates more expensive, since the blocks forming extents of the parity sets need to be locked and recalculated under some circumstances. Small parity sets could consume more disk drive space for parity extents. In an alternate embodiment, different extent sets within a logical volume may have different parity set sizes. As with mirroring, this approach is more flexible than traditional systems since parity protected data can be dynamically mixed on the same disk drive with mirrored and unprotected data.

Unlike RAID 5 systems, it is not required in the present invention to spread the parity over all the extents in the parity set. This is necessary in RAID 5 systems to evenly distribute the extra I/O load for parity updates. Using the techniques described herein, I/O operations are distributed by having numerous extents per logical volume. However striping across data extents is useful to improve sequential I/O performance to the logical volume and to reduce the size of write operations that update all blocks protected by the same parity blocks. This is more efficient because there is no need to read data to calculate the new parity. To simplify allocation, the striping factor can equal the parity set size.

Extent mirroring and extent parity protection are used to protect against the loss of data when there is a disk drive failure. It is also important to render it unlikely that data will be lost if multiple-rive failures occur. With traditional mirroring no data will be lost unless both disk drives in the mirror are simultaneously down. With a traditional 5 column RAID 5 set of disk drives, data loss would require 2 out of 5 disk drives to fail at the same time. If a traditional system contains many disk drives, the chances of any two of the disk drives that contain redundant data failing at the same time are fairly small. However, if extent mirroring is performed by randomly picking any other disk drive out of 1000 (for example) for the mirrored copy of the extent, and extents are mirrored on many of the 1000 disk drives, then the chance of any two disk drives failing which contain mirrored data greatly increases. If such a two disk failure occurs, then some extent is likely to be lost because it is mirrored on those 2 disk drives. The multiple-disk failure scenario could also result in increased risks of lost data if parity extent sets are spread over increased numbers of disk drives. In fact, the risks of lost data is even greater for parity protection than for mirroring since a greater percentage of disk drives contain redundancy information for any particular piece of data.

Figure 6:
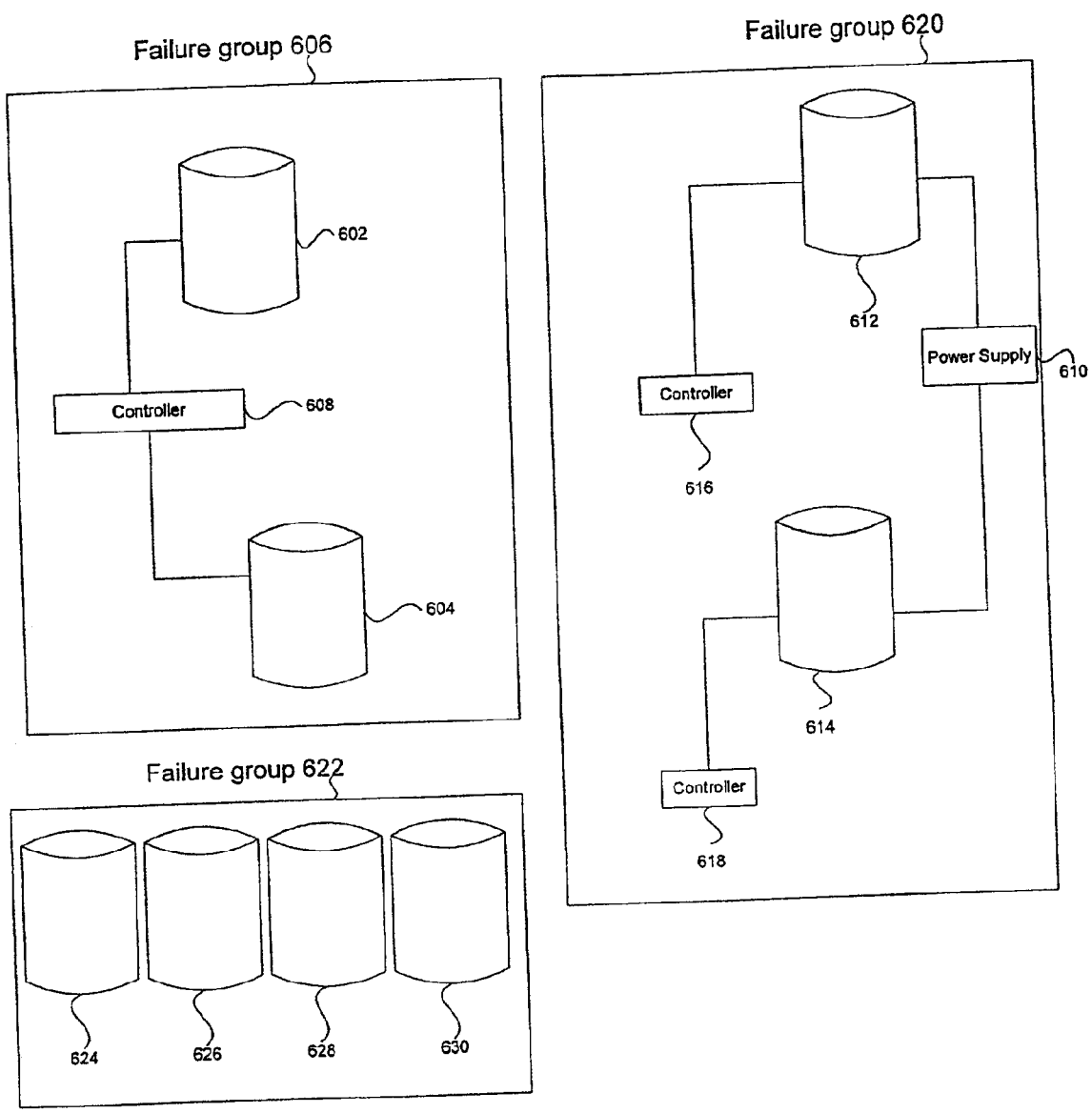
FIG. 6 illustrates disk drives divided into failure groups.

The solution to the multiple-disk failure problem is to limit the number of disk drives that are used to store redundant data. Thus if disk drive X fails, a second failure will not lose data unless the failure occurs to one of N other disk drives where N is a relatively small number. To accomplish this in an embodiment of the present invention, each named disk drive can be associated with a "failure group." All named drives in a failure group share some common disk drive failure criteria, which is any failure mode or condition which is projected to cause the related disk drives to fail at the same time period. The projected failure may cause either permanent loss of data or may result in temporary loss of access. For example, disk drives in a failure group may share a common hardware component or may be located in a common geographic location. The techniques described herein avoid allocating redundancy data to disk drives that are in the same failure group. In the example of FIG. 6, two disk drives (602 and 604) that share the same controller 608 are designated to the same failure group 606. If two disk drives (612 and 614) are on the same power supply 610 but different controllers (616 and 618), they would be in the same failure group 620 if power supply failure is a practical concern. Disk drives 624, 626, 628, and 630 share a common projected failure condition which results in these disk drives being assigned to the same failure group 622. Thus, disk drives are in the same failure group if there is a failure mode that could affect each of the disk drives and redundant data is maintained to protect against that failure. There should be at least two failure groups to implement the proper redundancy.

Mirror partners are defined to limit the number of disk drives that protect data for redundancy purposes. Each disk drive is associated with a corresponding list of its mirror partners. Each disk drive should be in a different failure group from its mirror partners. In an embodiment, the list of mirror partners for a disk drive is listed in the header for that disk drive.

Referring to FIG. 7, shown is a table of a possible mirror partnership configuration for the disk drives depicted in FIG. 6. A partnership is preferably symmetric—if disk drive 602 lists disk drive 612 as its partner then disk drive 612 will also list disk drive 602 as a partner. Mirror partners are in different failure groups from each other, but a disk drive may have multiple mirror partners that are in the same failure group. For example, disk drive 602 may have both disk drives 624 and 628 as mirror partners, even though both disk drive 624 and disk drive 628 are in the same failure group.

Mirror partners should be chosen to be in as many different failure groups as possible. When allocating extents with mirroring or parity protection, sets of extents are preferably allocated using mirror partners. The allocation begins by picking any disk drive in the disk group and allocating one extent on that disk drive. This extent is the primary extent in the extent set. The secondary extents are allocated on mirror partners of the primary extent's disk drive. When allocating an extent set for a logical volume, any disk drive may be chosen, but if the logical volume is mirrored, the mirror extent should be allocated from a mirror partner of the primary drive. Thus mirrored data can only be lost if both a disk drive and one of its mirror partners fail.

As shown in FIG. 7, the number of mirror partners for any particular disk drive should be limited. For example, disk drive 602 from failure group 606 only lists disk drives 612, 624, and 628 as its mirror partners, even though the pool of disk drives from failure groups 620 and 622 also include disk drives 614, 626, and 630. Limiting the number of mirror partners for a disk drive reduces the number of disk drives that contain redundant copies of a particular data item, thereby reducing the probability of losing data if a multiple disk drive failure occurs. The number of mirror partners for any particular disk drive can be different from that of other disk drives. Thus, disk drive 602 has three mirror partners while disk drive 604 has four mirror partners.

Using mirror partners also limit the chances of multiple-drive failures damaging a parity protected extent. A parity set is allocated by picking any disk drive as the primary disk set to hold the parity extent and then allocating the data extents on its mirror partners. Each data extent should be located on a mirror partner that is in a different failure group from other extents in the parity set. To limit the risk of lost data, the mirror partnerships can be more particularly specified for the kind of redundancy algorithm the mirror partnership is used for. For example, in an embodiment, only some of the mirror partners of a disk drive are used for both mirrored and parity protected data extents. These are called "full mirror partners." Partnerships that are used only for mirroring and not for parity protected data are called "mirror only partners." Partnerships that are used only for parity protection and not for mirroring data are called "parity only partners." The type of the mirror partner is a symmetric property of the partnership—if A is a mirror only partner of B then B is a mirror only partner of A.

If a disk drive fails, protected extents can be rebuilt from that disk drive's mirror partners. By having multiple mirror partners, the extra I/O load for the rebuild is spread over multiple disk drives. This reduces the mean time to repair the failure with a hot standby, since a higher I/O rate can be used to reconstruct lost data. It also means that the reconstruction can be accomplished by looking at the mirror partner's allocation tables. Thus no other disk drives need to be examined. A lower mean time to repair reduces the probability of having two simultaneous failures.

An embodiment comprises different failure group criteria based upon the redundancy algorithm employed. Particular disk drives may be considered part of the same failure group for a redundancy algorithm having higher demand levels of availability, but considered in different failure groups for redundancy algorithms having lower demands for reliability. For example, two disk drives on a common controller could be considered part of the same failure group for a high-reliability mirrored data system, but may be considered in two separate failure groups for a system having lower demand-levels for reliability.

Disk drives that are listed as a mirror partner of another disk drive may not always be available to be used for mirroring extents. This may occur, for example, if the disk drive selected to mirror a primary extent does not contain sufficient space to allocate storage for the secondary extent. If this occurs, then another mirror partner of the disk drive containing the primary extent must be selected to allocate the secondary extent. In an embodiment, if there is insufficient space on the mirror partners of a primary disk to allocate all of the required secondary extents (e.g., an extent is triple mirrored but the primary disk does not have at least two available mirror partners to allocate the secondary extents), then the primary extent is deallocated and a new disk drive is selected to allocate the primary extent.

Further details regarding a system to manage the allocations of redundancy data are described in copending U.S. Patent Application Ser. No. [Not Yet Assigned], filed concurrently herewith, which is hereby incorporated by reference in its entirety.

Operational Processes

This section described some of the operational methods, processes, and algorithms employed in one embodiment of the invention.

A. Create Disk System

Initially the disk system should be configured to contain at least one disk group with at least one named disk drive (or at least two disk drives in two different failure groups if redundancy methods are employed). The disk drives are formatted as empty named disk drives and the directory logical volumes are created with a single mirrored data extent. The parameters for creating the root disk group and each named drive are specified.

B. Create Disk Group

Creating a disk group involves creating an entry in the disk group directory. This new entry creates a disk group that is initially without any disk drives. The lowest unused entry in the disk group directory is normally selected when a new disk group is created (this means that disk group numbers may be reused). Examples of parameters specified for each disk group are:

Group name
Physical block size
Allocation unit size
Maximum number of mirror partners per disk drive (both full and mirror-only partners)

C. Delete Disk Group

Deletion of a disk group is procedurally implemented by clearing a specified entry from the disk group directory. In an embodiment, a disk group can only be deleted only if it contains no disk drives. The root disk group cannot normally be deleted.

D. Create Logical Volume

Figure 8:
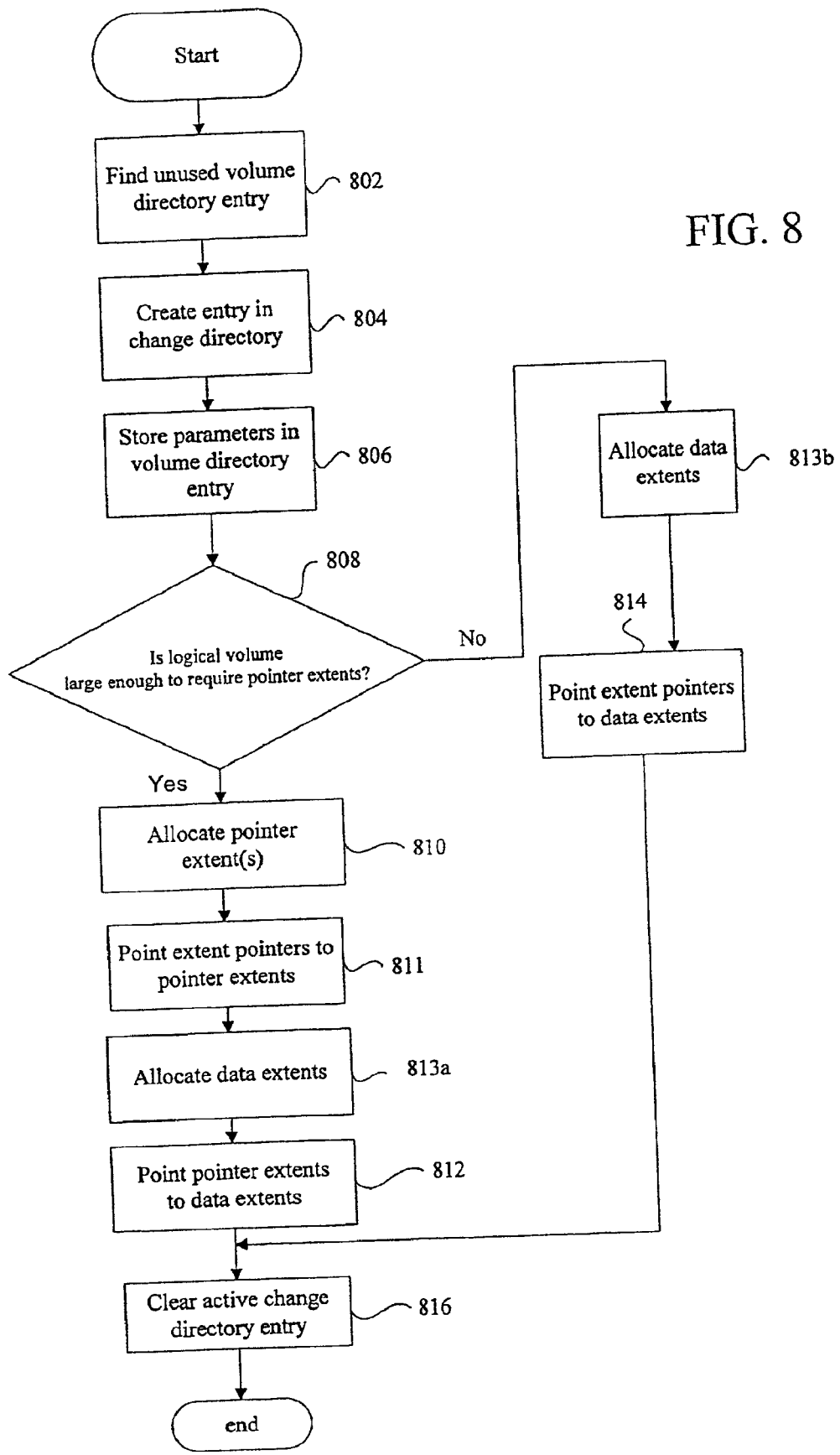
FIG. 8 is a flow diagram showing a process for creating a logical volume.

Examples of logical volume parameters that may be specified when creating a logical volume are:

Initial logical volume size
Redundancy—number of mirror copies or parity extent size set
Pointer disk group
Pointer extent size
Data disk group
Data extent size
Stripe factor and unit size Referring to the process flowchart on FIG. 8, the following actions are performed to create a logical volume:

1. Find an unused logical volume directory entry (802). Normally, the lowest unused logical volume entry is selected when creating a new logical volume. This means that logical volume numbers may be reused.
2. Find an unused active change directory entry (804). Record in active change directory that a logical volume is being created. If the create process does not successfully complete, the active change directory entry will allow identification of the aborted or failed operation, and allow a recovery process to delete the partially created logical volume.
3. Store logical volume parameters in the newly created logical volume directory entry (806).
4. Determine if the logical volume is large enough to require pointer extents (808). If so, then allocate enough mirrored extent sets and store pointers in the directory entry (810 and 811). Note that pointer extents are usually not striped. Allocate data extents (813*a*) and store pointers in the pointer extents (812).
5. If the logical volume is small enough in size, then allocate data extents (813*b*) and store pointers directly in logical volume directory entry (814). The allocations of 813*a* and 813*b* are performed at as many different disk drives as practical. The action of allocating a data extent (813*a* and 813*b*) also updates the allocation table. Either the mirrored extent or parity extent algorithm can be used to allocate extents (See section below on allocating extents for more details).
6. Clear the active change directory entry (816). This commits the creation of the logical volume.

E. Expand Logical Volume

Figure 9:
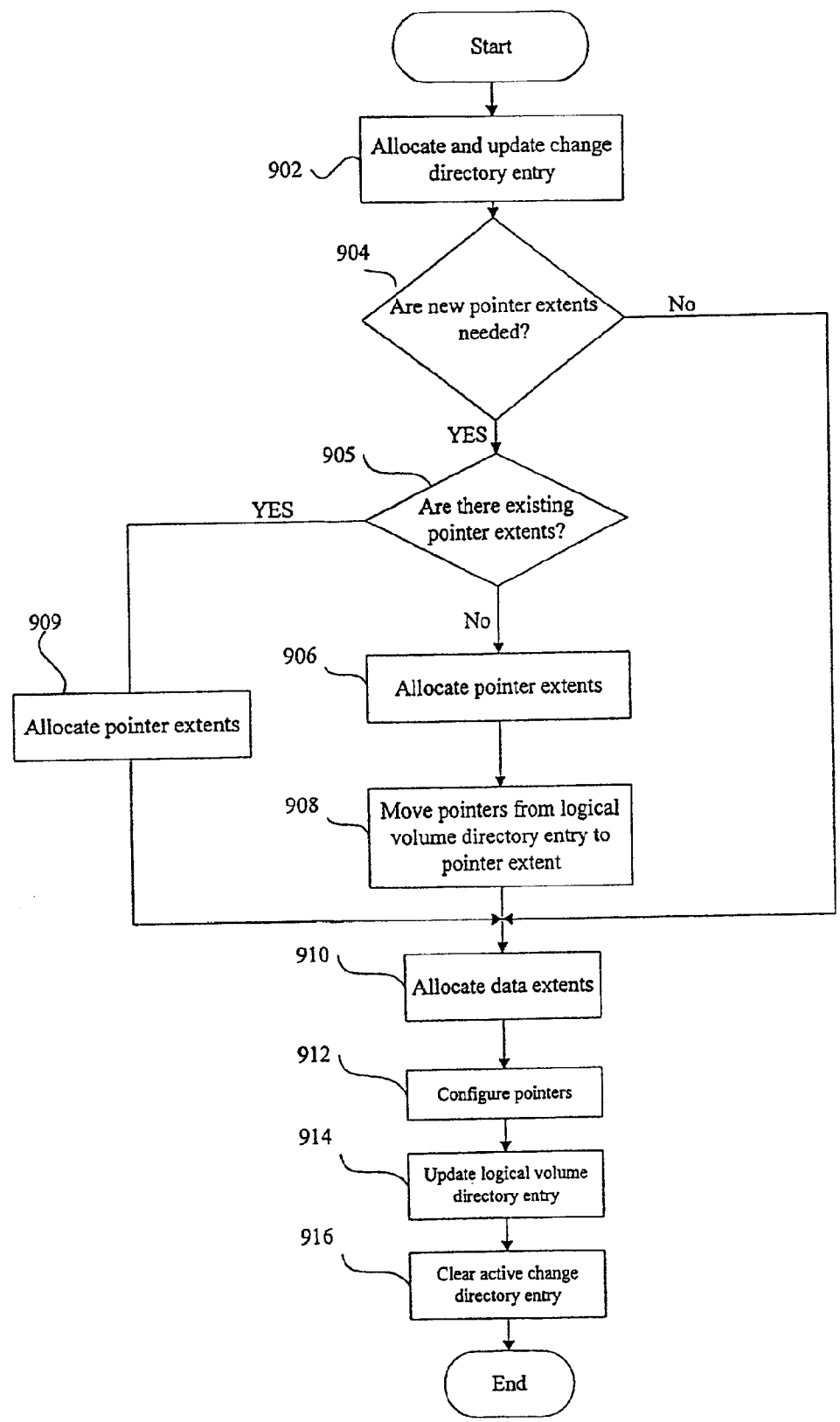
FIG. 9 is a flow diagram showing a process for expanding a logical volume.

The process for expanding a logical volume is very similar to the process for allocating space when creating a new logical volume. The arguments needed in a present embodiment to implement this process are the logical volume number and the new logical volume size. Other information required for the allocations is already in the directory entry. As illustrated in FIG. 9, the following actions perform the process of expanding a logical volume:

1. Allocate and update an active change directory entry with a resize entry (902). The original size of the logical volume is recorded in the entry. If there is a failure the logical volume will be shrunk back to the original size.
2. Determine whether new pointer extents are needed (904). There are two principle reasons for requiring new pointer extents. First, the logical volume may have existing pointer extents (905), but the existing extents may be insufficient for the new logical volume size. If this is the case, then new pointer extent(s) are allocated to point to the new data extents (909). Second, if the logical volume does not presently have pointer extents but they will required at the new logical volume size, then pointer extent(s) are allocated and the pointers from the logical volume directory entry are moved to the first block of the new extent (906 and 908). In either case, if additional pointer extents are required the logical volume directory entry is updated to point to the new pointer extents.

3. Allocate new data extents and store pointers in logical volume directory entry (if the logical volume is small enough) or in pointer extents (if logical volume is large enough to require pointer extents) (910 and 912). The allocations are performed on as many different disk drives as practical. Either mirroring or parity protection can be used to allocate the extents. See section below on allocating extents.

4. Update the logical volume size in the logical volume directory entry and clear entry in the active change directory (914 and 916). This allows I/O operations to be performed to the new area of the logical volume.

F. Allocate Mirrored Extent Set

This process is directed towards allocation of extents when not using a parity extent for redundancy protection. This includes singleton extent allocation as a mirroring factor of one (singleton extents are extents which are not mirrored). A set of extents is allocated such that each extent is on a different disk drive. The following are examples of information that may be utilized to perform an allocation.

Figure 10A:
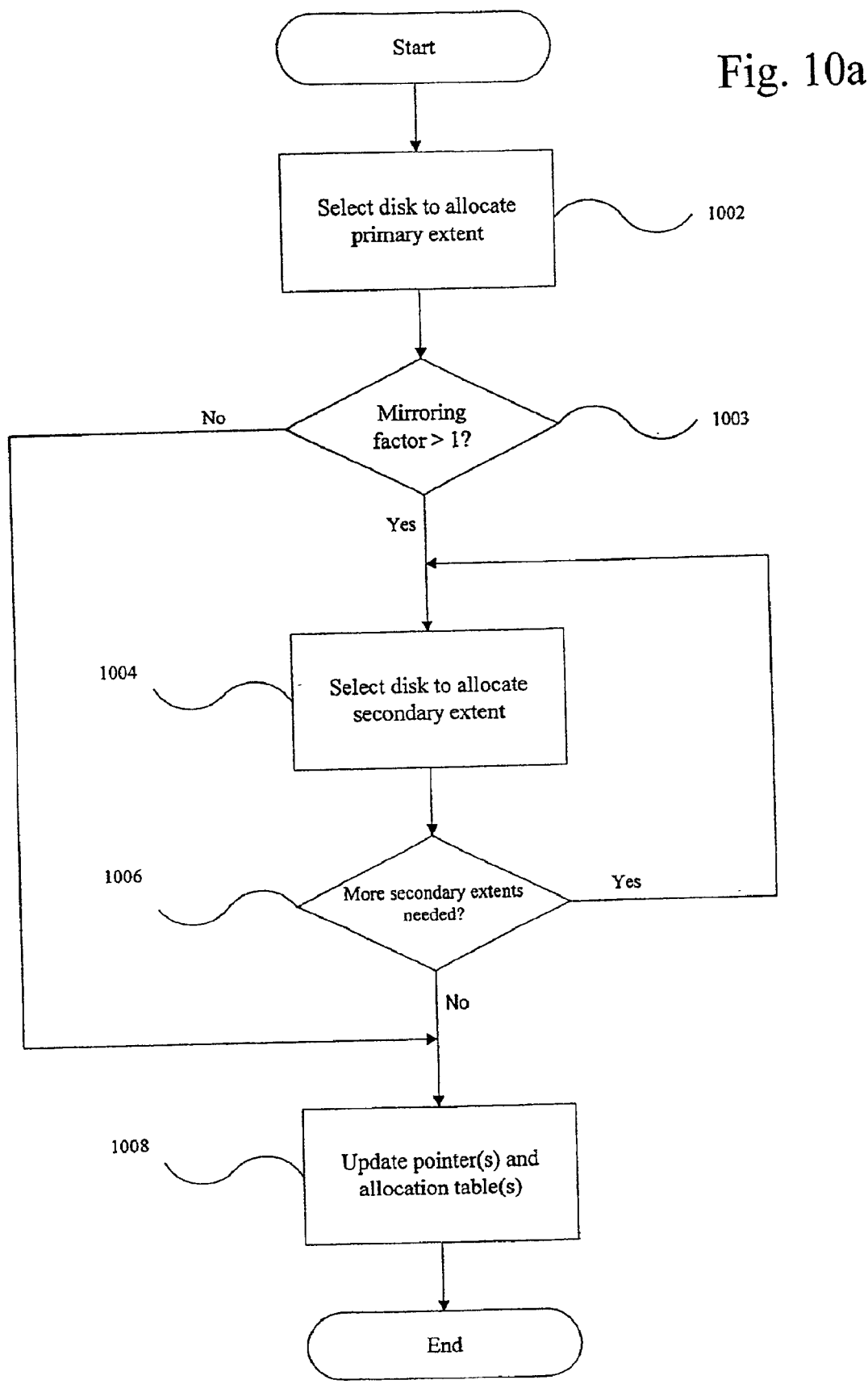
FIGS. 10A and 10B are flow diagrams showing processes for allocating mirrored extent sets.

Disk group
Extent size
Mirroring factor
Striping factor
Logical volume number
Extent type (data or pointer) and offset Turning to FIG. 10*a*, the following actions are performed to accomplish the allocation when striping is not used:

1. Select a disk drive to allocate the primary extent of an extent set (1002) and allocate extent on the selected disk drive. In an embodiment, a round robin algorithm is used to evenly spread extents across disk drives. The primary disk should have sufficient space to store the data extent.

2. Determine whether the mirroring factor is greater than one (i.e., whether the data to be written is mirrored) (1003). If so, then select a disk drive to allocate a secondary extent (1004) and allocate extent on the selected disk drive. The selected disk drive should be a mirror partner of the disk drive containing the primary extent and not already used for an extent in the extent set. The selected disk drive should have sufficient free space to allocate the secondary extent. If sufficient space is not available, then another mirror partner of the primary disk must be selected to allocate the secondary extent. If no mirror partners are available to allocate the secondary extent, then the process returns back to process action 1002 where a new disk drive is selected for the primary extent and the previously allocated primary extent is deallocated.

3. Determine whether additional mirroring is needed (i.e., if the mirroring factor is three or greater) (1006). If so, then return to 1004.

4. Once all primary and secondary extents have been allocated, update pointers in either the logical volume directory or in pointer extents to point to the new extents (1008). The appropriate allocation tables should also be updated to reflect the allocations.

Figure 10B:
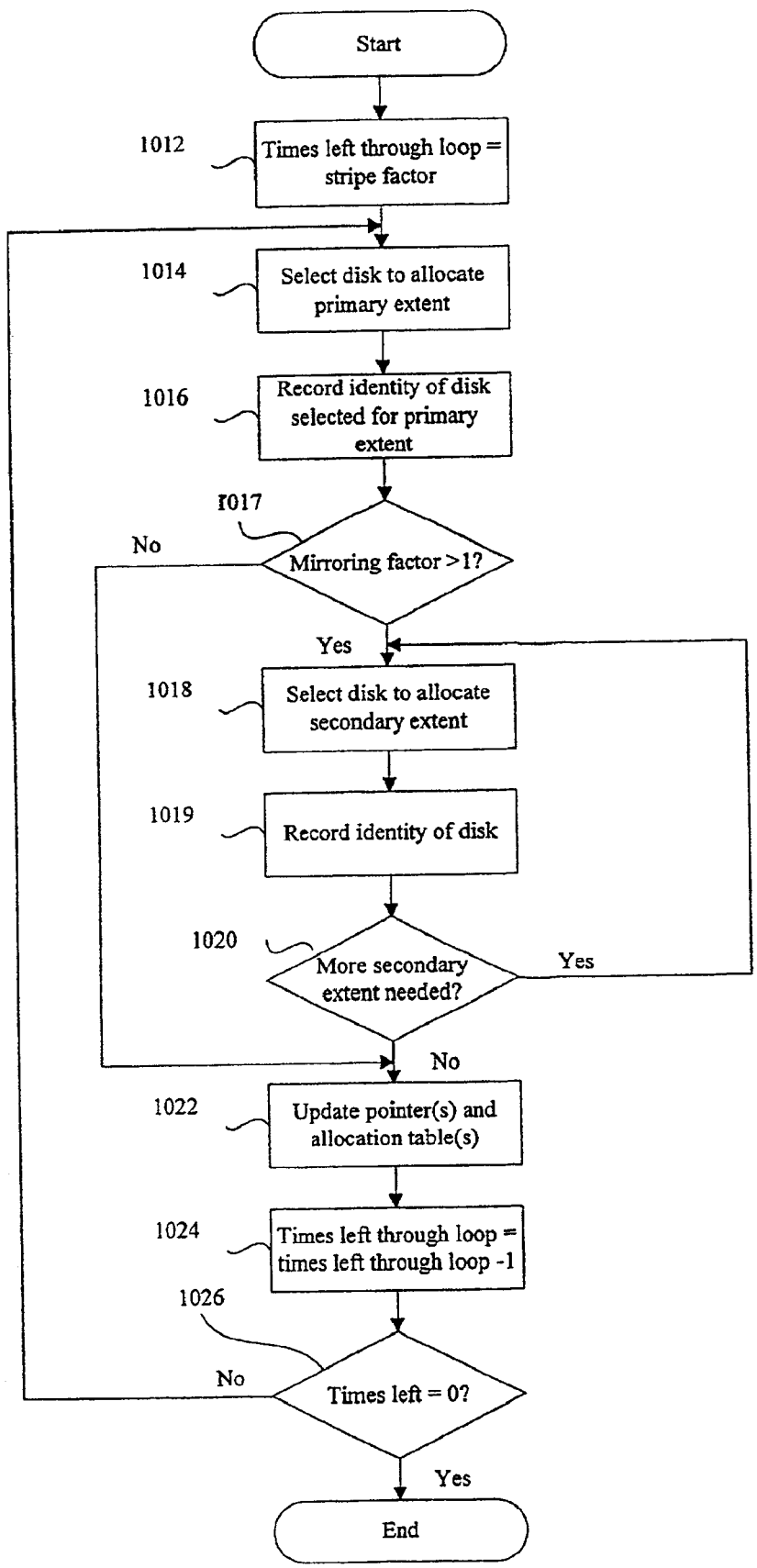

FIG. 10*b* illustrates the actions to be performed when disk striping is employed during the allocation.

1. The total number of extents to be allocated is the mirroring factor times the striping factor. Thus, the present process for allocating the primary and secondary extents is repeated stripe factor times. The number of times to proceed through this loop is initialized (1012).

2. Select a disk drive to allocate the primary extent of an extent set (1014) and allocate extent on the selected disk drive. In an embodiment, a round robin algorithm is used to evenly spread extents across disk drives. The primary disk should have sufficient space to store the data extent. Because striping is employed, the identity of the disk drive selected for the primary extent is recorded (1016). When additional primary or secondary extents are allocated according to the striping factor, this recorded information will be used to ensure that additional allocations occur on other disk drives.

3. Determine whether the mirroring factor is greater than one (1017). If so, then select a disk drive to allocate a secondary extent (1018) and allocate appropriate extent on the selected disk drive. The selected disk drive should be a mirror partner of the disk drive containing the primary extent. The selected disk drive should have sufficient free space to allocate the secondary extent. If sufficient space is not available, then another mirror partner of the primary disk must be selected to allocate the secondary extent. If no mirror partners are available to allocate the secondary extent, then the process returns back to process action 1014 where a new disk drive is selected for the primary extent and the previously allocated primary extent is deallocated. The identity of the disk drive selected for the secondary extent is recorded (1019) so that further allocation of primary or secondary extents according to the striping factor do not occur on this disk drive.

4. Determine whether additional mirroring is needed (i.e., if the mirroring factor is three or greater) (1020). If so, then return to 1018.

5. Once all primary and secondary extents have been allocated, update pointers in either the logical volume directory or in pointer extents to point to the new extents (1022). The appropriate allocation tables should be updated to reflect the allocations.

6. 1012–1022 are repeated striping factor times. The number of times left to go through this loop is updated each time the loop completes (1024). If the number of times through the loop is less than the stripe factor, then return to 1014 (1026). The recorded information for the primary extent allocation is used to ensure that further allocation a according to the stripe factor results in allocations to differing disk drives.

In an embodiment of the invention, the primary and secondary extents of an extent set are configured to point to each other. One implementation of this comprises each primary extent pointing to each of its associated secondary extents. Each secondary extent points to the primary extent. In the event of a disk drive failure that results in a lost extent, the pointers could be followed to identify and recover the lost extent. In another implementation, the allocation table entry for an allocation unit for a primary extent identifies the mirror partner disks that contain members of the extent set that includes the primary extent. The allocation unit table entry for allocation units for each of the members of the extent set identifies the disk drive containing the primary extent. If a failure occurs, the allocation tables of the remaining disk drives can be scanned to identify members of the extent set and to recover allocation units on the failed disk drive.

G. Allocate Parity Extent Set

This process describes how extents are allocated when using a parity extent for redundancy protection. A group of extents should be allocated such that each extent is on a different disk drive. The following list identifies examples of information used to perform an allocation. Note that a striping factor may not be needed since it depends on the size of the parity set, and the extent type is always data in a present embodiment.

Disk group
Extent size
Parity set size
Logical volume number
Extent offset

Figure 11:
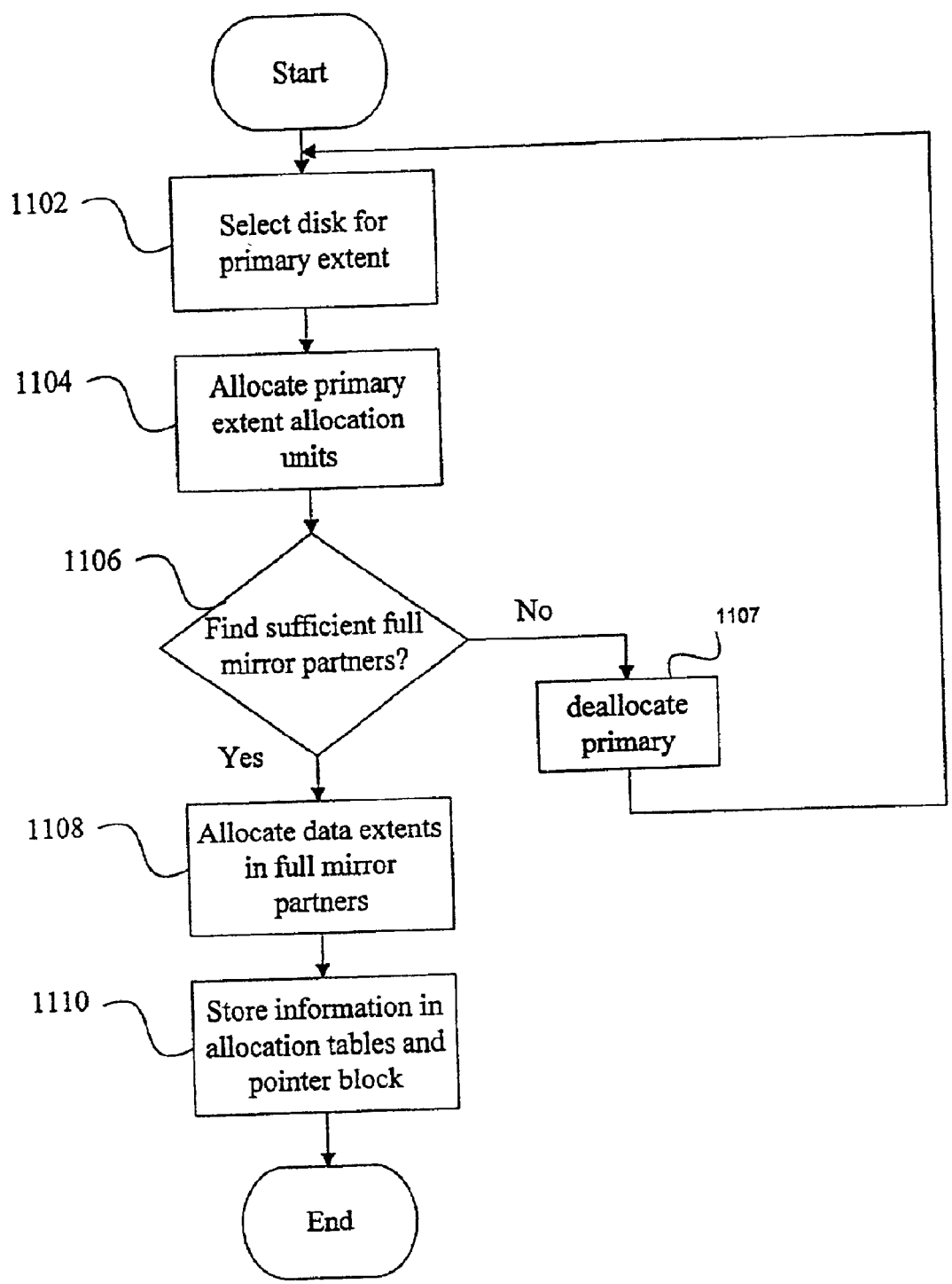
FIG. 11 is a flow diagram showing a process for allocating parity extent sets.

Referring now to FIG. 11, the following actions are performed to accomplish the allocation:

1. Find a disk drive for the primary extent of the parity extent set (1102) and allocate parity extent on selected disk drive (1104). In an embodiment, a round robin algorithm is used to evenly spread extents across disk drives.
2. Allocate data extents on full mirror partners of the disk drive containing the parity extent (1106 and 1108). Each data extent should be in a different failure group. To limit exposure to multiple disk failures, mirror only partners should not be used for parity protected data. The selected full mirror partners should have available free space to allocate the data extents. If sufficient full mirror partners cannot be found (1108), then deallocate the primary extent (1107) and go back to 1102 to select a different disk drive for the primary parity extent.
3. Store information relating to mirror partners, logical volume number, extent type, and logical volume offset in allocation tables of the extents that were allocated (1110). Different logical volume offsets may be stored for each extent in the parity set. Also, update pointers in either the logical volume directory or in pointer extent to point to the newly allocated extents.

In an embodiment of the invention, the primary and secondary extents of a parity extent set are configured to point to each other. One implementation of this comprises each parity extent pointing to each of its associated data extents. Each data extent points to the parity extent. In the event of a disk drive failure that results in a lost extent, the pointers could be followed to identify and recover the lost extent. In another implementation, the allocation table entry for an allocation unit for a primary extent identifies the mirror partner disks that contain members of the parity set that includes the primary extent. The allocation unit table entry for allocation units for each of the members of the parity set identifies the disk drive containing the primary extent. If a failure occurs, the allocation tables of the remaining disk drives can be scanned to identify members of the parity set and to recover allocation units on the failed disk drive.

H. Delete Logical Volume

Figure 12:
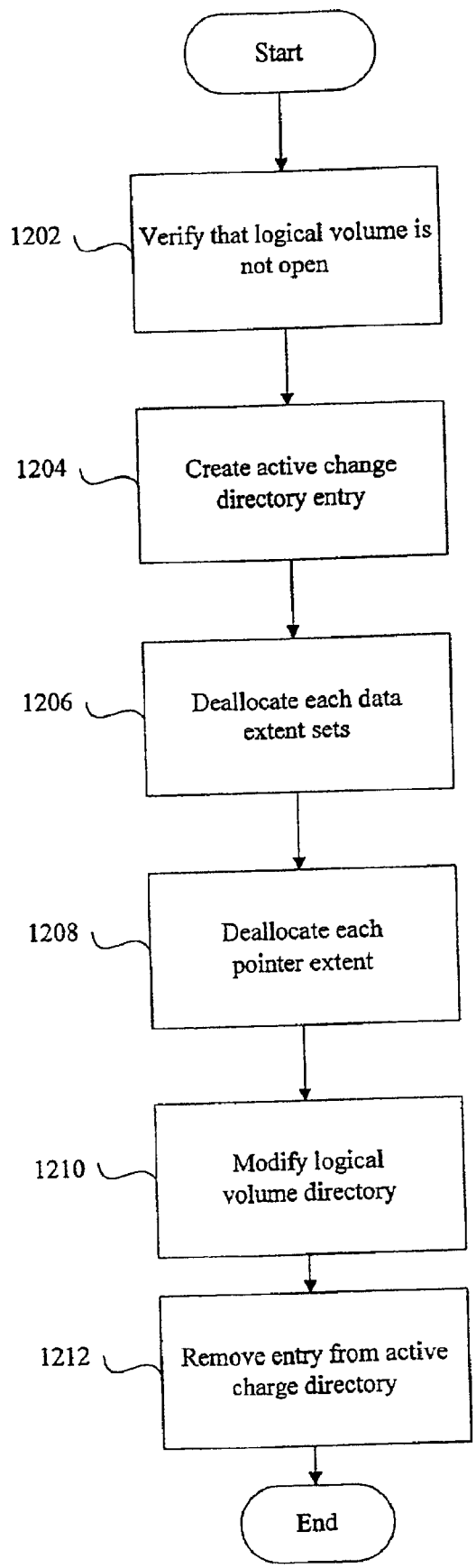
FIG. 12 is a flow diagram showing a process for deleting logical volumes.

The present process is used to delete a logical volume. To ensure consistency, the logical volume should not be open for any other purpose during the delete operation. In an embodiment, the only argument required is the logical volume number. The following process actions correspond to the flowchart of FIG. 12:

1. Ensure the logical volume is not open (1202).
2. Create an active change directory entry to indicate the logical volume is being deleted (1204). Further opens will not be allowed on the logical volume. If a recovery process encounters the active change entry, then the recovery process will complete the deletion.
3. Starting at the last allocated data extent set, deallocate each data extent set (1206).
4. Starting at the last allocated pointer extent, deallocate each pointer extent (1208).
5. Mark the logical volume as deleted in the logical volume directory (1210) and remove the entry from the active change directory (1212).

I. Shrink Logical Volume

Figure 13:
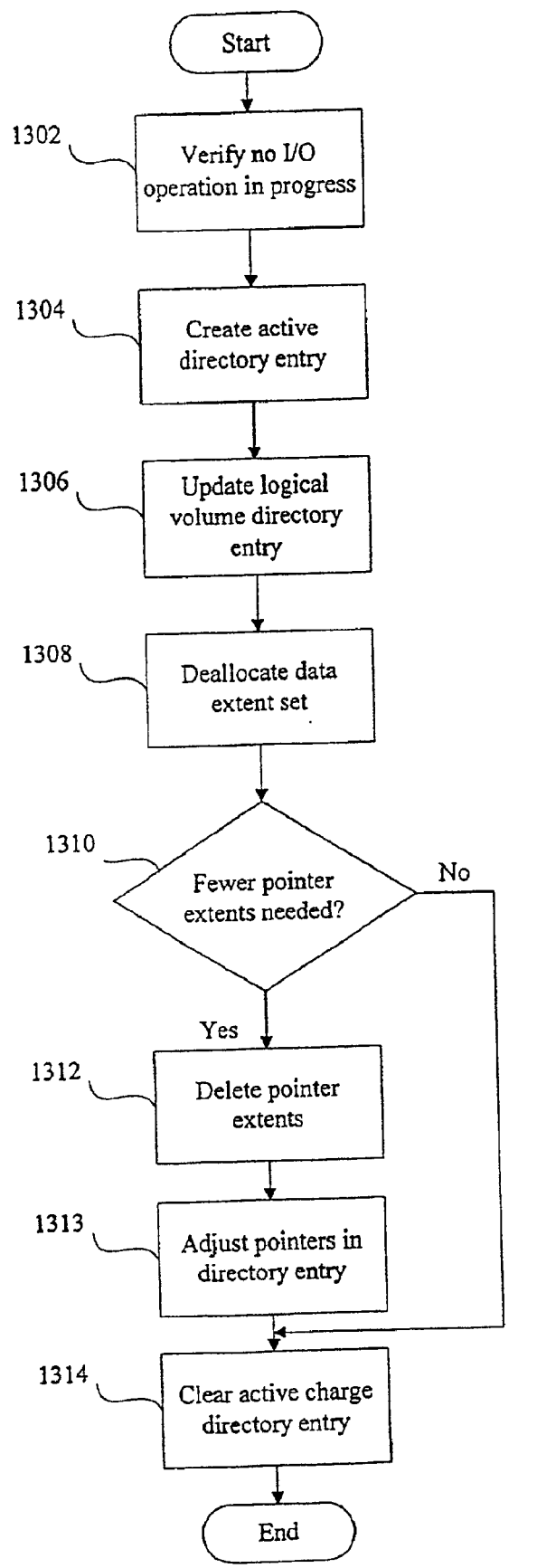
FIG. 13 is a flow diagram showing a process for reducing logical volumes.

The present process shrinks (or contracts) a logical volume. In an embodiment, shrinking a logical volume involves the deletion of extent sets from the end of the logical volume. Arguments to the process are the logical volume number and the new size. FIG. 13 illustrates the actions used to perform this process:

1. Verify there are no I/O operations in progress to the area that will be deleted (1302). Update the size in the logical volume directory entry (1306) and create an active change directory entry to indicate the shrink is in progress (1304). In the present embodiment, this will prevent any I/O operations to the area of the logical volume that is being deleted. If the shrinking process fails or aborts, a recovery process will find the active directory entry and complete the shrink of the logical volume.
2. Starting at the last allocated data extent set, deallocate each data extent set until the logical volume has shrunk to the correct size (1308).
3. Test whether fewer pointer extents are now required (1310). If fewer pointer extents are now required then delete the extraneous extents (1312). Otherwise, proceed to step 1314.
4. Configure pointers in the logical volume directory entry to reflect the deletion of pointer extents (1313). If the logical volume is now small enough to not need pointer extents, then process action 1313 comprises the movement of pointers from the first pointer extent block into the logical volume directory entry.
5. Clear active change entry and the shrinking status in the logical volume directory entry (1314).

J. Delete Extent Set

The present process is performed to delete an extent set. In the present embodiment, an extent set is deleted from a logical volume. The following are examples of arguments that are utilized to perform the deletion:

Logical volume number, extent type, and offset into logical volume for verification purposes
Extent size.
Number of extents in the set.
Pointers containing addresses of extents to delete.
Pointer to where extent set begins.

Figure 14:
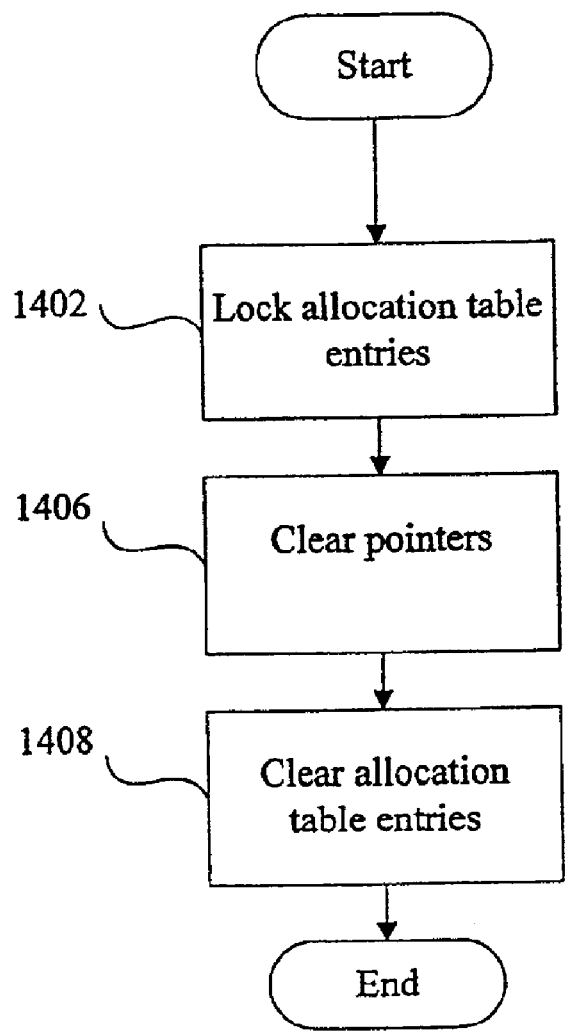
FIG. 14 is a flow diagram showing a process for deleting extent sets.

As shown in FIG. 14, the following actions comprise the process for deleting extent sets:

1. Lock allocation table entries for the extents to be deleted (1402). Verify the entries contain the correct extent descriptors.
2. Clear pointers to extent set from logical volume directory entry or from pointer extents (1406).

3. Clear the allocation table entries (1408).

K. Read/Write

I/O operations should coordinate with extent relocation to ensure that read operations access current data and that write operations do not become lost. It is assumed here that the I/O is entirely within one extent. If necessary, a larger request will be broken into multiple smaller requests.

A memory cache is maintained to hold pointer data for logical volumes that are open (e.g., logical volume directory, allocation table entries, and pointer extents). Normally, only pointer data for open logical volumes are maintained in memory, although circumstances may arise in which pointer data for unopen logical volumes are also in memory. Maintaining only a subset of the pointer information for the disk system provides a significant advantage over conventional systems that must maintain all of the pointer information for all logical volumes on the system in memory, since those conventional systems are therefore severely limited both in quantity as well as ability to administer that pointer information.

An I/O operation according to this embodiment utilizes the following parameters:

Logical volume number

Logical volume offset

I/O type—data read or data write. Note that a logical volume directory entry I/O is actually a data I/O for logical volume zero.

The following process actions are performed to execute an I/O operation:

1. Find the pointer extent that points to the extent to be read or written. For a small logical volume or a pointer extent access this is the logical volume directory entry. For a larger logical volume this may be a block from a pointer extent.
2. Find the pointer for the data extent of this I/O. If it is marked as invalid due to an extent relocation then wait for the relocation to complete.
3. Add an entry to the 110 request list to prevent extent relocation before this I/O completes. This entry preferably includes the I/O type.
4. Issue the disk I/O
5. Remove the I/O request entry. If there is a process waiting to relocate the extent then wake it up.

L. Relocate Extent Set

At times, it is necessary to move an extent or a set of extents from one disk drive (or a set of disk drives) to another disk drive (or to another set of disk drives). When this is done, the copy operation should be coordinated with other access operations. The following procedure presumes that the new extents have already been allocated. In the present embodiment, the following arguments should be specified:

The location of the current pointers to extents.

The number of extents to be relocated.

A list of new extents

Figure 15:
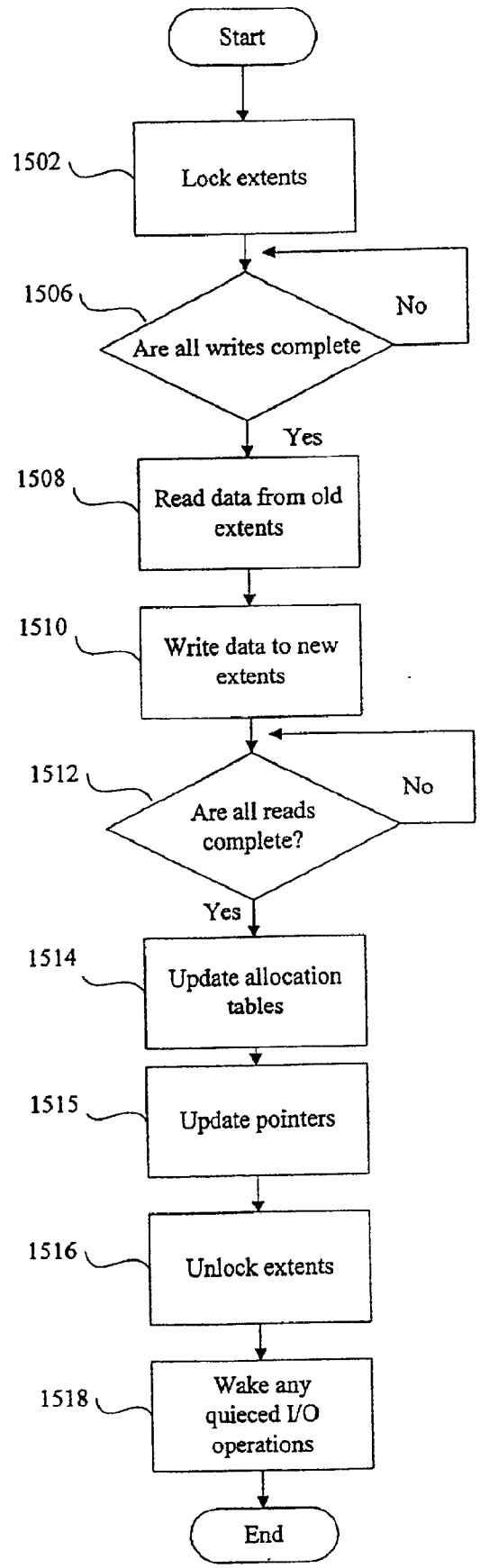
FIG. 15 is a flow diagram showing a process for relocating extent sets.

Referring to FIG. 15, the following actions are performed to atomically relocate extents:

1. Lock the extent set to be moved (1502). In an embodiment, this is accomplished by making an entry in a locked extent list and modifying pointers to be invalid.
2. Scan the active I/O request list and wait until any writes to the extent set are complete (1506).
3. Read data from the old extents (1508) and write data to the new extents (1510).
4. Scan the active I/O request list and wait until any reads of the extent sets are complete (1512).
5. Update the allocation table entries for both the old and new extents (1514).
6. Update pointers in either the logical volume directory entry or in pointer extent(s) (1515).
7. Unlock the locked extents (1516). Wake up any I/O operations that had been blocked during the relocation (1518).

M. Add Disk Drive

This section describes a process for adding a new disk drive to a disk group. In a present embodiment, adding to a disk group requires the following information describing the disk drive and how to access it:

The disk group

A name for the disk drive

The address of the disk drive for doing I/O to it

The physical sector size.

The size of the disk drive in sectors

The failure group for the disk drive

Figure 16:
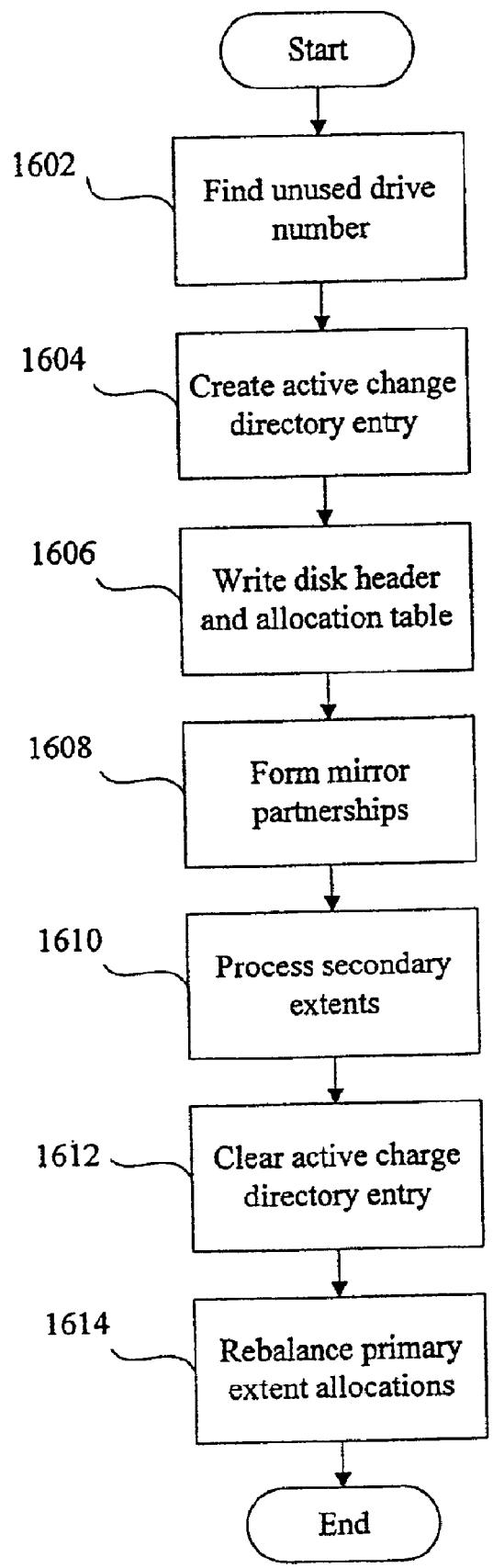
FIG. 16 is a flow diagram showing a process for adding a disk drive to a disk group.

As disclosed in FIG. 16, the following actions are performed to add a disk drive:

1. Scan disk drive table to find an unused disk drive number (1602).
2. Make an entry in the active change directory to indicate the disk drive is in the process of being added to a disk group (1604). If a failure occurs during this procedure, then the disk drive will be dropped from the disk group.
3. Write disk header and an empty allocation table on the disk drive (1606)
4. Form partnerships with disk drives that are in other failure groups which need additional mirror partners (1608). To accomplish this, scan through all failure groups picking at most one disk drive from a failure group. Do this repeatedly until there is a scan where some usable failure group cannot contribute a disk drive, or this disk drive has all the full and mirror only partners it can handle. Full partnerships are formed prior to mirror only partnerships. This should result in an almost equal number of partners from every usable failure group.
5. Determine the maximum number of full and mirror only partners that the disk drive may have from any failure group and still retain an even distribution of partners per failure group. In a present embodiment, this is basically the maximum number of partners divided by the number of usable failure groups rounded up. Small failure groups that are less than half the size of the average group are not considered usable when doing the divide. In addition, the new disk drive's own failure group is not usable.
6. Break existing partnerships and form new partnerships between the new disk drive and existing disk drives in the broken partnership. Thus the new disk drive will gain two partners for every broken partnership and the old disk drives will keep the same number of partners. The new partnerships will be the same type as the broken partnership—full or mirror only.

The disk drives in each usable failure group are scanned for partnerships to break. Small failure groups will not be scanned, but they may be involved in broken partnerships. Scanning the failure groups continue until all usable failure groups have been scanned without forming any partners. A partnership is breakable if both disk drives are not in the new disk drive's failure group, they are not already a partner of the new disk drive, the new disk drive is not within one of its maximum number of this type of partner, and/or their failure group does not already have the maximum number of partners of this type with the new drive. The list of partnerships to break is recorded in the active change directory so that they can be reestablished if recovery needs to drop the disk drive.

7. When breaking a partnership to form two new partnerships, it may be necessary to relocate secondary extents that were allocated as a result of the broken partnership (1610). Primary extents are not affected by this relocation. If a partnership between disk drive A and B is broken, then secondary extents allocated on B for an extent set with its primary extent on A will be relocated to the new disk drive. Similarly, secondary extents on A for primary extents on B will be relocated to the new drive. This allows the new disk drive to start sharing in the I/O load for existing data, but does not truly balance the load with existing disk drives. The new disk drive has less than half the space allocated compared to other disk drives, and all of it is for secondary extents. Secondary extents for parity extent sets have different access patterns than primary extents so the lack of primary extents represents an imbalance. The partners of the new disk drive also have an imbalance since they have fewer secondary extents than the average.

8. Now that all partnerships are established, the entry in the active change directory can be cleared to commit the disk drive to be part of the disk group (1612).

9. Rebalance primary extent allocations (1614). Ensure there is at least one rebalance running. If numerous disk drives have been added, it may be necessary to start more than one rebalance. Rebalancing will move primary extents from other disk drives to the newly added disk drive. This will also increase the number of secondary extents on the partners of the new disk drive.

N. Clear Disk Drive

This section is directed to a process from clearing data from a disk drive. If a disk drive is to be removed from a disk group or the disk drive is to be converted to a hot standby drive, then data stored on the disk drive needs to be reallocated to other disk drives. However, this may not be possible if there is not enough free space in the disk group. When this happens the disk drive is left in a clearing state so that the clearing can be retried when space becomes available.

Figure 17:
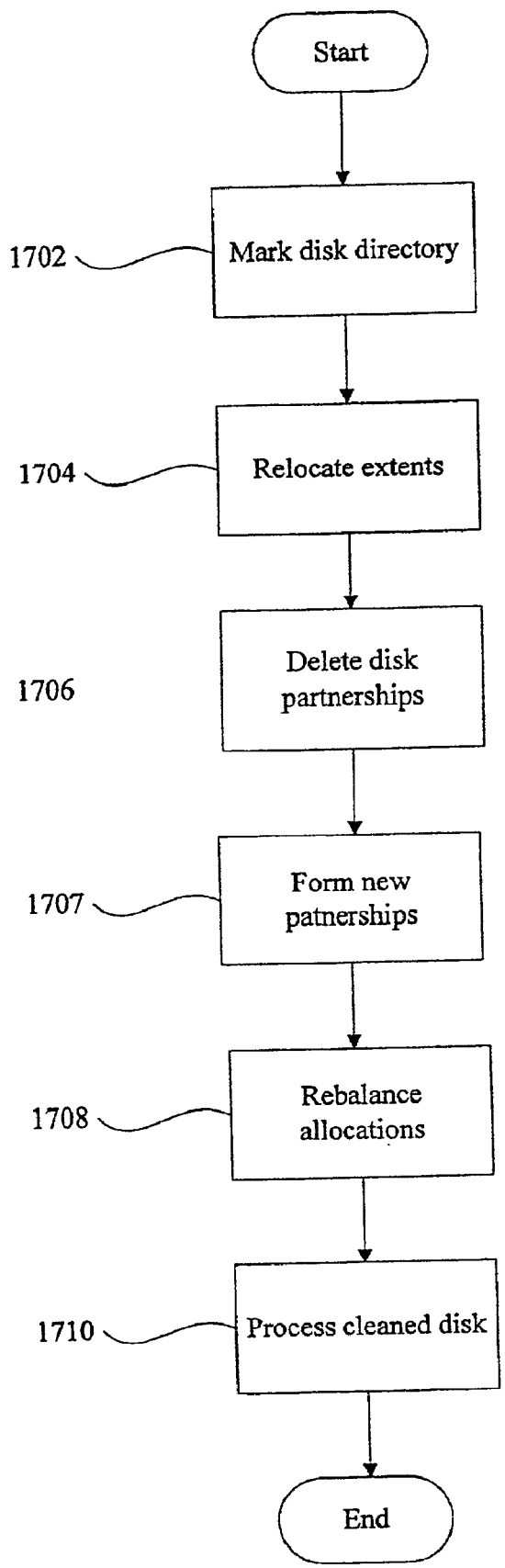
FIG. 17 is a flow diagram showing a process for clearing a disk drive.

Turning to FIG. 17, the following are actions are performed to clear a disk drive:

1. Mark the entry in the disk directory to indicate that the disk drive is being cleared (1702). This prevents any further allocation on the disk drive. Note that this state will persist until the disk drive is deleted or used as a hot standby.

2. Scan the allocation table to relocate every allocated extent (1704). If a primary extent is encountered, then relocate the entire extent set. If a secondary extent is encountered, then attempt to find a different mirror partner of the primary extent and relocate extent to alternate mirror partner. If there is no partner of the correct type and failure group with available space, then relocate entire extent set. If it is not possible to relocate an extent, then report an error and leave disk drive in the clearing state.

3. Delete all the partnerships for the disk drive (1706). After partnerships have been deleted, the process for finding partners when adding a new disk drive is used to find new partners for the disk drives that have lost a partner and are not being cleared themselves (1707). This procedure is performed after breaking all partnerships so that new partnerships can more easily be formed between disk drives with less than the maximum number of partners.

4. Disk drives with newly established partnerships will need to have the secondary allocations rebalanced (1708). Extent sets where the primary extent is on a disk drive in the new partnership may need to have some secondary extents moved to the new partners to keep the load on the partners even.

5. The cleared disk drive can be changed to a hot standby or removed from the disk group (1710).

O. Use Hot Standby

This section pertains to a process for utilizing a hot standby disk. A hot standby disk is a disk drive that is defined and recognized by the system, but is not immediately made available for data storage. Such a disk drive is normally associated with a specific disk group and is used to replace failed disk drives in the disk group. When the hot standby disk is added to a disk group, it is assigned a drive number and its header is written, but no partners are found and no allocation is done. Ideally each failure group should have at least one hot standby available. For systems with many small failure groups it would be possible to have a few failure groups that contain nothing but hot standbys.

Figure 18:
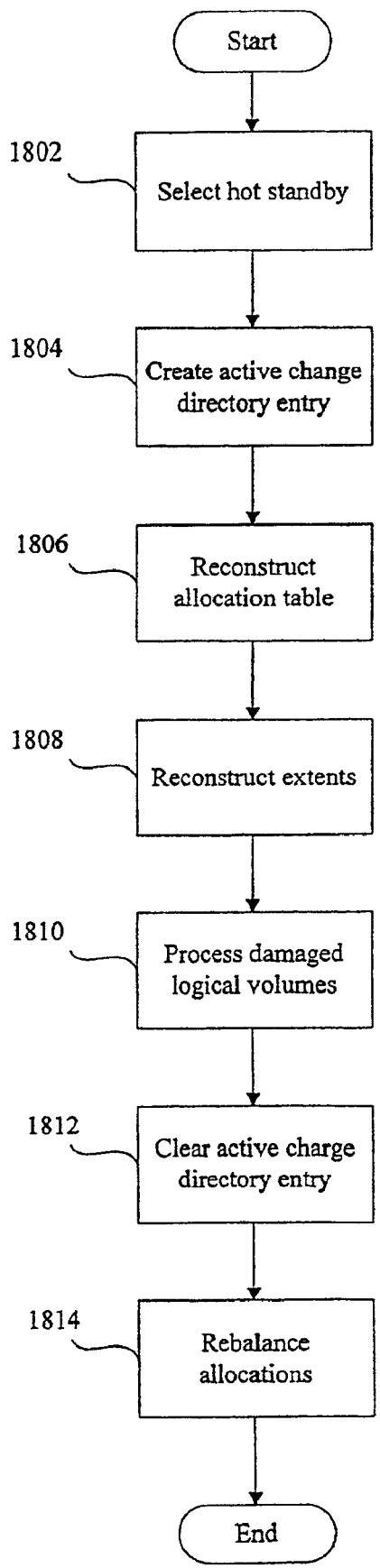
FIG. 18 is a flow diagram showing a process for deploying a hot standby drive.

As shown in FIG. 18, the following action are performed to replace a failed disk drive with a hot standby:

1. Choose a hot standby to replace the failed disk drive (1802). If there is a standby in the same failure group as the failed disk drive then it should be used. If a hot standby from a different failure group is used, then the disk drive must be chosen such that none of the redundant copies of any data appear in the same failure group. To ensure this, verify that none of the mirror partners of the failed disk drive and none of the full partners of full partners is in the hot standby disk's failure group. This also ensures that no failure group becomes over represented in the mirror partners of any particular disk drive.

2. Create an active change directory entry to indicate that a hot standby is being deployed (1804). If there is a system failure then the standby will return to being a standby and the failed disk drive will remain failed.

3. Reconstruct the allocation table of the failed disk drive for extents that were protected by mirroring or parity protection (1806). Use the drive directory to find mirror partners of the failed disk drive. Scan allocation tables of the mirror partners. Entries that are for extent sets involving the failed disk drive will identify the logical volume number and offset of the damaged extent set. Use this information to find pointers to extents on the failed disk drive. Use the pointers to reconstruct the allocation table entries. Mark the unreferenced allocation units as available, and write out the new allocation table.

4. Use the redundant data to reconstruct the extents on the standby disk (1808). This will involve locking the extents. The disk drive will have to be marked to indicate that it is in rebuild mode so that it is not used for reads, but will be updated by writes. Note that writes which need to update a parity extent on the failed disk drive will have to reconstruct the parity data from all extents in the extent set rather than reading it from the hot standby.

5. The new disk drive can now be used for accessing and allocating mirrored or parity protected data. However there may be logical volumes damaged when the disk drive was lost because they had no redundancy. These logical volumes must be marked as damaged before singleton extents (i.e., unmirrored extents) can be allocated and accessed on the disk drive (1810). This is accomplished by scanning the logical volume directory for logical volumes that could have singleton extents on the failed disk drive. The pointers for those logical volumes are scanned for extents on the failed disk drive. If any are found they are marked as lost.

6. The standby drive is now a completely functional replacement for the failed disk drive. The entry in the active change directory is cleared (1812).

7. A rebalance should be started if a significant number of singleton extents were marked as lost (1814).

P. Delete Failed Disk Drive

If a disk drive has failed and no hot standby is available to replace it, then the disk drive's mirrored and parity protected data can be relocated. The process for deleting a failed disk drive is similar to the process for clearing a disk drive, except the allocation table is constructed from the mirror partners and logical volume directory as is performed for hot standby replacement. The data to be relocated should be reconstructed from the mirror partners rather than read from the failed disk drive. Lost singleton extents are flagged as missing by scanning the logical volume directory and pointer extents as is done when a disk drive is replaced with a hot standby.

O. Rebalance Allocation

Over time, statistical fluctuations and the addition/deletion of disk drives may cause some disk drives in a disk group to have more data than other disk drives. In addition, a logical volume may become unevenly distributed across disk drives in a disk group. These imbalances can be gradually removed by running one or more rebalancing processes. Rebalancing processes relocate entire extent sets to even out the allocation of primary extents across disk drives in a disk group. Secondary allocations do not need rebalancing since they are tied to a primary allocation and the secondary allocations are maintained evenly across the mirror partners of a disk drive. There are two rebalancing algorithms—by disk drive and by logical volume. Both algorithms can be run at the same time by different processes.

Rebalancing by disk drive repeatedly moves primary extents from a disk drive with too many primary extents to one with too few. The disk drives with the most and least primary extents are chosen for this procedure. Another disk drive will be chosen if one of the chosen disk drives is in the middle of another rebalancing relocation. The first choice for a primary extent to relocate is from a logical volume that has multiple primary extents on a first disk drive and no primary or secondary extents on a second disk drive. Second choice would be from a logical volume that has the greatest imbalance in allocation between the two disk drives. If there are multiple primary extents from the same logical volume to choose from, the one that is going to give the best logical volume distribution across disk drives will be chosen.

Rebalancing by logical volume looks at each logical volume in the logical volume directory and moves primary extents to evenly distribute the logical volume across disk drives in the disk group. The first choice for a primary extent to relocate is from a disk drive that has multiple primary extents to a disk drive with no extents of any type on it for this logical volume. Second choice would be from a disk drive that has the most extents from this logical volume to the disk drive with the least. The relocated extent should be chosen to ensure that two extents that are close to each other within the logical volume are not on the same disk drive.

Hardware Overview

Figure 19:
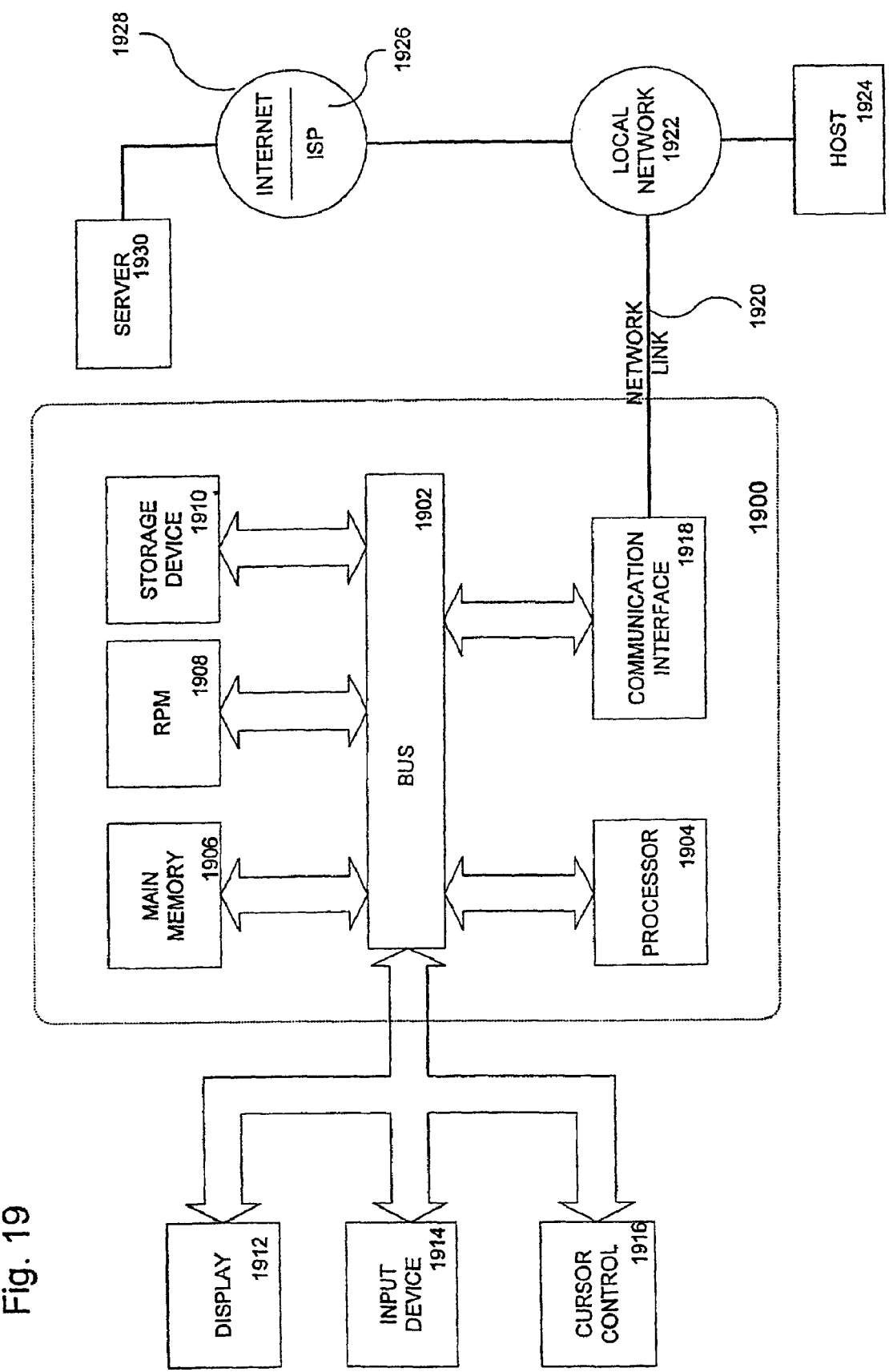
FIG. 19 is a diagram of a computer hardware system with which the present invention can be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A data storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for managing and allocating storage within a system comprising multiple disk drives. According to one embodiment of the invention, such use is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. One or more processors in a multi-processing arrangement may also be employed to execute the sequences of instructions contained in main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, arty other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector coupled to bus 1902 can receive the data carried in the infrared signal and place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the >>information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application manages storage systems that contain multiple data storage devices, as described herein.

The received code may be executed by processor 1904 as it is received, and/or stored in storage device 1910, or other non-volatile storage for later execution. In this manner, computer system 1900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method of distributing a volume across a plurality of disk drives, the method comprising the steps of:

determining that a particular disk drive of said plurality of disk drives is to store more than one piece of said volume; and selecting a plurality of pieces of said volume to store on said particular disk drive based at least in part on how far apart said pieces are within an address space of said volume.

2. The method of claim 1 wherein the step of selecting includes selecting to store, on said particular disk drive, pieces that are farther apart within the address space of said volume over pieces that are closer together within the address space of said volume.

3. A method of managing data, the method comprising the steps of:

storing the data within a plurality of logical volumes spread across a plurality of disk drives;

maintaining, for each volume of said plurality of logical volumes, a list of entries;

wherein each entry in the list of entries corresponds to a logical volume piece and identifies a disk drive piece that stores the corresponding logical volume piece;

maintaining a logical volume directory that includes the list of entries for each logical volume of said plurality of logical volumes; and using the list of entries for a particular logical volume to translate logical volume I/O requests into physical disk drive I/O requests.

4. The method of claim 3 wherein the step of maintaining a list of entries includes maintaining an ordered list of entries, wherein the list of entries is ordered based on logical volume addresses associated with the entries in the list of entries.

5. The method of claim 3, further comprising the step of maintaining, within said logical volume directory, information about the size of each logical volume.

6. The method of claim 3, further comprising the step of maintaining, within said logical volume directory, information about a striping factor of each logical volume.

7. The method of claim 3, further comprising the step of maintaining, within said logical volume directory, information about a stripe unit of each logical volume.

8. The method of claim 3, further comprising the step of maintaining, within said logical volume directory, information about allocation of each logical volume.

9. The method of claim 3, further comprising the step of maintaining, within said logical volume directory, information about a disk group of each logical volume.

10. The method of claim 3, further comprising the step of maintaining, within said logical volume directory, information about an extent size of each logical volume.

11. The method of claim 3, further comprising the step of maintaining, within said logical volume directory, information about a redundancy algorithm of each logical volume.

12. The method of claim 3 wherein:
the plurality of logical volumes includes a first logical volume;
the method includes the steps of
maintaining a directory entry for the first logical volume;
storing one or more extent pointers for the first logical volume in the directory entry for the first logical volume.

13. The method of claim 12 wherein the step of storing one or more extent pointers includes storing one or more extent pointers that point directly to data extents of the first logical volume.

14. The method of claim 12 wherein the step of storing one or more extent pointers includes storing one or more extent pointers that point indirectly to data extents of the first logical volume.

15. The method of claim 14 wherein the step of storing one or more extent pointers that point indirectly to data extents of the first logical volume includes storing one or more extent pointers that point to pointer extents.

16. The method of claim 15 wherein the step of storing one or more extent pointers that point to pointer extents includes:
storing a first extent pointer that points to a pointer extent that resides on a disk in a first disk group; and
storing in the pointer extent a second extent pointer that points to a data extend that resides in a second disk group;
wherein the first disk group is different than said second disk group.

17. The method of claim 15 wherein the step of storing one or more extent pointers that point to pointer extents includes:
storing a first extent pointer that points to a pointer extent that has a first size; and
storing in the pointer extent a second extent pointer that points to a data extend that has a second size;
wherein the first size is different than said second size.

18. A method of managing data, the method comprising the steps of:
storing the data within a plurality of logical volumes spread across a plurality of disk drives, wherein the plurality of logical volumes includes a first logical volume;
maintaining a logical volume directory that includes a directory entry for each volume of said plurality of logical volumes;
storing, in the directory entry for the first logical volume, one or more extent pointers for locating data extents that belong to the first logical volume.

19. The method of claim 18 wherein the step of storing one or more extent pointers includes the step of:
determining whether the first logical volume exceeds a size threshold; and
if the first logical volume exceeds a size threshold, then storing one or more extent pointers that point indirectly, through one or more pointer extents, to data extents for said first logical volume; and
if the first logical volume does not exceed said size threshold, then storing one or more extent pointers that point directly to data extents for said first logical volume.

20. The method of claim 18 wherein the step of storing one or more extent pointers includes storing one or more extent pointers that point to pointer extents.

21. The method of claim 20 wherein the step of storing one or more extent pointers that point to pointer extents includes:
storing a first extent pointer that points to a pointer extent that resides on a disk in a first disk group; and
storing in the pointer extent a second extent pointer that points to a data extent that resides in a second disk group;
wherein the first disk group is different than said second disk group.

22. The method of claim 21 wherein the step of storing one or more extent pointers that point to pointer extents includes:
storing a first extent pointer that points to a pointer extent that has a first size; and
storing in the pointer extent a second extent pointer that points to a data extend that has a second size;
wherein the first size is different than said second size.

23. The method of claim 18 wherein the step of maintaining a logical volume directory includes storing, at a first position in the logical volume directory, a particular directory entry that corresponds to a logical volume for storing said logical volume directory.

24. The method of claim 18 further comprising the steps of:
establishing a set of said plurality of disk drives as a root disk group; and
recording in a header of every disk drive in the root disk group an address associated with a first data extent of a logical volume for storing the logical volume directory.

25. The method of claim 18 further comprising the step of:
on each disk drive of said plurality of disk drives, maintaining an allocation table that has an entry for each allocation unit of the disk drive; and
wherein the entry associated with an allocation unit that is part of a particular logical volume includes data indicating that the allocation unit is part of said particular logical volume.

26. The method of claim 25 wherein the entry associated with an allocation unit that is part of a particular logical volume includes data indicating a specific data extent, of said particular logical volume, to which said allocation unit belongs.

27. The method of claim 25 further comprising the step of using information from the allocation table of a disk drive to rebuild lost pointer extents that held extent pointers to one or more allocation units on the disk drive.

28. The method of claim 25 further comprising the step of using information from pointer extents that hold extent pointers to one or more allocation units on a disk drive to restore an allocation table of the disk drive.

29. The method of claim 25 further comprising the step of deleting a particular logical volume by performing the steps of:
writing an active change directory entry indicating that the particular logical volume is to be deleted;
after writing the active change directory entry, updating allocation tables of disk drives that contain pieces of said particular logical volume, and updating the logical volume directory entry for the particular logical volume; and
after updating the allocation tables and the logical volume directory entry, marking the active change directory entry as complete.

30. The method of claim 25 further comprising the step of creating a particular logical volume by performing the steps of:
- writing an active change directory entry indicating that the particular logical volume is to be created;
- after writing the active change directory entry, updating allocation tables of disk drives that are to contain pieces of said particular logical volume, and creating a logical volume directory entry for the particular logical volume; and
- after updating the allocation tables and creating the logical volume directory entry, marking the active change directory entry as complete.

31. The method of claim 18 wherein the step of storing one or more extent pointers includes the step of:
- storing one or more extent pointers that point directly to data extents for said first logical volume; and
- in response to a change that increases the size of the first logical volume, performing the steps of
  - allocating one or more pointer extents; and
  - storing in the directory entry one or more extent pointers that point indirectly, through said one or more pointer extents, to data extents for said first logical volume.

32. A computer-readable medium carrying instructions for distributing a volume across a plurality of disk drives, the computer-readable medium comprising instructions for performing the steps of:
- determining that a particular disk drive of said plurality of disk drives is to store more than one piece of said volume; and
- selecting a plurality of pieces of said volume to store on said particular disk drive based at least in part on how far apart said pieces are within an address space of said volume.

33. The computer-readable medium of claim 32 wherein the step of selecting includes selecting to store, on said particular disk drive, pieces that are farther apart within the address space of said volume over pieces that are closer together within the address space of said volume.

34. A computer-readable medium carrying instructions for managing data, the computer-readable medium comprising instructions for performing the steps of:
- storing the data within a plurality of logical volumes spread across a plurality of disk drives;
- maintaining, for each volume of said plurality of logical volumes, a list of entries;
- wherein each entry in the list of entries corresponds to a logical volume piece and identifies a disk drive piece that stores the corresponding logical volume piece;
- maintaining a logical volume directory that includes the list of entries for each logical volume of said plurality of logical volumes; and
- using the list of entries for a particular logical volume to translate logical volume I/O requests into physical disk drive I/O requests.

35. The computer-readable medium of claim 34 wherein the step of maintaining a list of entries includes maintaining an ordered list of entries, wherein the list of entries is ordered based on logical volume addresses associated with the entries in the list of entries.

36. The computer-readable medium of claim 34, further comprising instructions for performing the step of maintaining, within said logical volume directory, information about the size of each logical volume.

37. The computer-readable medium of claim 34, further comprising instructions for performing the step of maintaining, within said logical volume directory, information about a striping factor of each logical volume.

38. The computer-readable medium of claim 34, further comprising instructions for performing the step of maintaining, within said logical volume directory, information about a stripe unit of each logical volume.

39. The computer-readable medium of claim 34, further comprising instructions for performing the step of maintaining, within said logical volume directory, information about allocation of each logical volume.

40. The computer-readable medium of claim 34, further comprising instructions for performing the step of maintaining, within said logical volume directory, information about a disk group of each logical volume.

41. The computer-readable medium of claim 34, further comprising instructions for performing the step of maintaining, within said logical volume directory, information about an extent size of each logical volume.

42. The computer-readable medium of claim 34, further comprising instructions for performing the step of maintaining, within said logical volume directory, information about a redundancy algorithm of each logical volume.

43. The computer-readable medium of claim 34 wherein:
- the plurality of logical volumes includes a first logical volume;
- the computer-readable medium includes instructions for performing the steps of
  - maintaining a directory entry for the first logical volume;
  - storing one or more extent pointers for the first logical volume in the directory entry for the first logical volume.

44. The computer-readable medium of claim 43 wherein the step of storing one or more extent pointers includes storing one or more extent pointers that point directly to data extents of the first logical volume.

45. The computer-readable medium of claim 43 wherein the step of storing one or more extent pointers includes storing one or more extent pointers that point indirectly to data extents of the first logical volume.

46. The computer-readable medium of claim 45 wherein the step of storing one or more extent pointers that point indirectly to data extents of the first logical volume includes storing one or more extent pointers that point to pointer extents.

47. The computer-readable medium of claim 46 wherein the step of storing one or more extent pointers that point to pointer extents includes:
- storing a first extent pointer that points to a pointer extent that resides on a disk in a first disk group; and
- storing in the pointer extent a second extent pointer that points to a data extend that resides in a second disk group;
- wherein the first disk group is different than said second disk group.

48. The computer-readable medium of claim 46 wherein the step of storing one or more extent pointers that point to pointer extents includes:
- storing a first extent pointer that points to a pointer extent that has a first size; and
- storing in the pointer extent a second extent pointer that points to a data extend that has a second size;
- wherein the first size is different than said second size.

49. A computer-readable medium carrying instructions for managing data, the computer-readable medium comprising instructions for performing the steps of:

storing the data within a plurality of logical volumes spread across a plurality of disk drives, wherein the plurality of logical volumes includes a first logical volume;

maintaining a logical volume directory that includes a directory entry for each volume of said plurality of logical volumes;

storing, in the directory entry for the first logical volume, one or more extent pointers for locating data extents that belong to the first logical volume.

50. The computer-readable medium of claim 49 wherein the step of storing one or more extent pointers includes the step of:

determining whether the first logical volume exceeds a size threshold; and if the first logical volume exceeds a size threshold, then storing one or more extent pointers that point indirectly, through one or more pointer extents, to data extents for said first logical volume; and if the first logical volume does not exceed said size threshold, then storing one or more extent pointers that point directly to data extents for said first logical volume.

51. The computer-readable medium of claim 49 wherein the step of storing one or more extent pointers includes storing one or more extent pointers that point to pointer extents.

52. The computer-readable medium of claim 51 wherein the step of storing one or more extent pointers that point to pointer extents includes:

storing a first extent pointer that points to a pointer extent that resides on a disk in a first disk group; and storing in the pointer extent a second extent pointer that points to a data extent that resides in a second disk group;

wherein the first disk group is different than said second disk group.

53. The computer-readable medium of claim 52 wherein the step of storing one or more extent pointers that point to pointer extents includes:

storing a first extent pointer that points to a pointer extent that has a first size; and storing in the pointer extent a second extent pointer that points to a data extend that has a second size;

wherein the first size is different than said second size.

54. The computer-readable medium of claim 49 wherein the step of maintaining a logical volume directory includes storing, at a first position in the logical volume directory, a particular directory entry that corresponds to a logical volume for storing said logical volume directory.

55. The computer-readable medium of claim 49 further comprising instructions for performing the steps of:

establishing a set of said plurality of disk drives as a root disk group; and recording in a header of every disk drive in the root disk group an address associated with a first data extent of a logical volume for storing the logical volume directory.

56. The computer-readable medium of claim 49 further comprising instructions for performing the step of:

on each disk drive of said plurality of disk drives, maintaining an allocation table that has an entry for each allocation unit of the disk drive; and wherein the entry associated with an allocation unit that is part of a particular logical volume includes data indicating that the allocation unit is part of said particular logical volume.

57. The computer-readable medium of claim 56 wherein the entry associated with an allocation unit that is part of a particular logical volume includes data indicating a specific data extent, of said particular logical volume, to which said allocation unit belongs.

58. The computer-readable medium of claim 56 further comprising instructions for performing the step of using information from the allocation table of a disk drive to rebuild lost pointer extents that held extent pointers to one or more allocation units on the disk drive.

59. The computer-readable medium of claim 56 further comprising instructions for performing the step of using information from pointer extents that hold extent pointers to one or more allocation units on a disk drive to restore an allocation table of the disk drive.

60. The computer-readable medium of claim 56 further comprising instructions for performing the step of deleting a particular logical volume by performing the steps of:

writing an active change directory entry indicating that the particular logical volume is to be deleted;

after writing the active change directory entry, updating allocation tables of disk drives that contain pieces of said particular logical volume, and updating the logical volume directory entry for the particular logical volume; and after updating the allocation tables and the logical volume directory entry, marking the active change directory entry as complete.

61. The computer-readable medium of claim 56 further comprising instructions for performing the step of creating a particular logical volume by performing the steps of:

writing an active change directory entry indicating that the particular logical volume is to be created;

after writing the active change directory entry, updating allocation tables of disk drives that are to contain pieces of said particular logical volume, and creating a logical volume directory entry for the particular logical volume; and after updating the allocation tables and creating the logical volume directory entry, marking the active change directory entry as complete.

62. The computer-readable medium of claim 49 wherein the step of storing one or more extent pointers includes the step of:

storing one or more extent pointers that point directly to data extents for said first logical volume; and in response to a change that increases the size of the first logical volume, performing the steps of allocating one or more pointer extents; and storing in the directory entry one or more extent pointers that point indirectly, through said one or more pointer extents, to data extents for said first logical volume.

63. An apparatus for distributing a volume across a plurality of disk drives, the apparatus comprising a memory storing instructions which, when executed by one or more processors, causes the performance of:

determining that a particular disk drive of said plurality of disk drives is to store more than one piece of said volume; and selecting a plurality of pieces of said volume to store on said particular disk drive based at least in part on how far apart said pieces are within an address space of said volume.

64. The apparatus of claim 63 wherein the step of selecting includes selecting to store, on said particular disk drive, pieces that are farther apart within the address space of said volume over pieces that are closer together within the address space of said volume.

65. An apparatus for managing data, the apparatus comprising a memory storing instructions which, when executed by one or more processors, causes the performance of:
storing the data within a plurality of logical volumes spread across a plurality of disk drives;
maintaining, for each volume of said plurality of logical volumes, a list of entries;
wherein each entry in the list of entries corresponds to a logical volume piece and identifies a disk drive piece that stores the corresponding logical volume piece;
maintaining a logical volume directory that includes the list of entries for each logical volume of said plurality of logical volumes; and
using the list of entries for a particular logical volume to translate logical volume I/O requests into physical disk drive I/O requests.

66. The apparatus of claim 65 wherein the step of maintaining a list of entries includes maintaining an ordered list of entries, wherein the list of entries is ordered based on logical volume addresses associated with the entries in the list of entries.

67. The apparatus of claim 65, wherein the memory further comprises one or more additional instructions which, when executed by the one or more processors, cause the performance of maintaining, within said logical volume directory, information about the size of each logical volume.

68. The apparatus of claim 65, wherein the memory further comprises one or more additional instructions which, when executed by the one or more processors, cause the performance of maintaining, within said logical volume directory, information about a striping factor of each logical volume.

69. The apparatus of claim 65, wherein the memory further comprises one or more additional instructions which, when executed by the one or more processors, cause the performance of maintaining, within said logical volume directory, information about a stripe unit of each logical volume.

70. The apparatus of claim 65, wherein the memory further comprises one or more additional instructions which, when executed by the one or more processors, cause the performance of maintaining, within said logical volume directory, information about allocation of each logical volume.

71. The apparatus of claim 65, wherein the memory further comprises one or more additional instructions which, when executed by the one or more processors, cause the performance of maintaining, within said logical volume directory, information about a disk group of each logical volume.

72. The apparatus of claim 65, wherein the memory further comprises one or more additional instructions which, when executed by the one or more processors, cause the performance of maintaining, within said logical volume directory, information about an extent size of each logical volume.

73. The apparatus of claim 65, wherein the memory further comprises one or more additional instructions which, when executed by the one or more processors, cause the performance of maintaining, within said logical volume directory, information about a redundancy algorithm of each logical volume.

74. The apparatus of claim 65 wherein:
the plurality of logical volumes includes a first logical volume;
The apparatus includes instructions for performing the steps of
maintaining a directory entry for the first logical volume;
storing one or more extent pointers for the first logical volume in the directory entry for the first logical volume.

75. The apparatus of claim 74 wherein the step of storing one or more extent pointers includes storing one or more extent pointers that point directly to data extents of the first logical volume.

76. The apparatus of claim 74 wherein the step of storing one or more extent pointers includes storing one or more extent pointers that point indirectly to data extents of the first logical volume.

77. The apparatus of claim 76 wherein the step of storing one or more extent pointers that point indirectly to data extents of the first logical volume includes storing one or more extent pointers that point to pointer extents.

78. The apparatus of claim 77 wherein the step of storing one or more extent pointers that point to pointer extents includes:
storing a first extent pointer that points to a pointer extent that resides on a disk in a first disk group; and
storing in the pointer extent a second extent pointer that points to a data extend that resides in a second disk group;
wherein the first disk group is different than said second disk group.

79. The apparatus of claim 77 wherein the step of storing one or more extent pointers that point to pointer extents includes:
storing a first extent pointer that points to a pointer extent that has a first size; and
storing in the pointer extent a second extent pointer that points to a data extend that has a second size;
wherein the first size is different than said second size.

80. An apparatus for managing data, the apparatus comprising a memory storing instructions which, when executed by one or more processors, causes the performance of:
storing the data within a plurality of logical volumes spread across a plurality of disk drives, wherein the plurality of logical volumes includes a first logical volume;
maintaining a logical volume directory that includes a directory entry for each volume of said plurality of logical volumes;
storing, in the directory entry for the first logical volume, one or more extent pointers for locating data extents that belong to the first logical volume.

81. The apparatus of claim 80 wherein the step of storing one or more extent pointers includes the step of:
determining whether the first logical volume exceeds a size threshold; and
if the first logical volume exceeds a size threshold, then storing one or more extent pointers that point indirectly, through one or more pointer extents, to data extents for said first logical volume; and
if the first logical volume does not exceed said size threshold, then storing one or more extent pointers that point directly to data extents for said first logical volume.

82. The apparatus of claim 80 wherein the step of storing one or more extent pointers includes storing one or more extent pointers that point to pointer extents.

83. The apparatus of claim 82 wherein the step of storing one or more extent pointers that point to pointer extents includes:
    storing a first extent pointer that points to a pointer extent that resides on a disk in a first disk group; and
    storing in the pointer extent a second extent pointer that points to a data extent that resides in a second disk group;
    wherein the first disk group is different than said second disk group.

84. The apparatus of claim 83 wherein the step of storing one or more extent pointers that point to pointer extents includes:
    storing a first extent pointer that points to a pointer extent that has a first size; and
    storing in the pointer extent a second extent pointer that points to a data extend that has a second size;
    wherein the first size is different than said second size.

85. The apparatus of claim 80 wherein the step of maintaining a logical volume directory includes storing, at a first position in the logical volume directory, a particular directory entry that corresponds to a logical volume for storing said logical volume directory.

86. The apparatus of claim 80 wherein the memory further comprises one or more additional instructions which, when executed by the one or more processors, cause the performance of:
    establishing a set of said plurality of disk drives as a root disk group; and
    recording in a header of every disk drive in the root disk group an address associated with a first data extent of a logical volume for storing the logical volume directory.

87. The apparatus of claim 80 wherein the memory further comprises one or more additional instructions which, when executed by the one or more processors, cause the performance of:
    on each disk drive of said plurality of disk drives, maintaining an allocation table that has an entry for each allocation unit of the disk drive; and
    wherein the entry associated with an allocation unit that is part of a particular logical volume includes data indicating that the allocation unit is part of said particular logical volume.

88. The apparatus of claim 87 wherein the entry associated with an allocation unit that is part of a particular logical volume includes data indicating a specific data extent, of said particular logical volume, to which said allocation unit belongs.

89. The apparatus of claim 81 wherein the memory further comprises one or more additional instructions which, when executed by the one or more processors, cause the performance of using information from the allocation table of a disk drive to rebuild lost pointer extents that held extent pointers to one or more allocation units on the disk drive.

90. The apparatus of claim 87 wherein the memory further comprises one or more additional instructions which, when executed by the one or more processors, cause the performance of using information from pointer extents that hold extent pointers to one or more allocation units on a disk drive to restore an allocation table of the disk drive.

91. The apparatus of claim 87 wherein the memory further comprises one or more additional instructions which, when executed by the one or more processors, cause the performance of deleting a particular logical volume by performing the steps of:
    writing an active change directory entry indicating that the particular logical volume is to be deleted;
    after writing the active change directory entry, updating allocation tables of disk drives that contain pieces of said particular logical volume, and updating the logical volume directory entry for the particular logical volume; and
    after updating the allocation tables and the logical volume directory entry, marking the active change directory entry as complete.

92. The apparatus of claim 87 wherein the memory further comprises one or more additional instructions which, when executed by the one or more processors, cause the performance of creating a particular logical volume by performing the steps of:
    writing an active change directory entry indicating that the particular logical volume is to be created;
    after writing the active change directory entry, updating allocation tables of disk drives that are to contain pieces of said particular logical volume, and creating a logical volume directory entry for the particular logical volume; and
    after updating the allocation tables and creating the logical volume directory entry, marking the active change directory entry as complete.

93. The apparatus of claim 80 wherein the step of storing one or more extent pointers includes the step of:
    storing one or more extent pointers that point directly to data extents for said first logical volume; and
    in response to a change that increases the size of the first logical volume, performing the steps of
    allocating one or more pointer extents; and
    storing in the directory entry one or more extent pointers that point indirectly, through said one or more pointer extents, to data extents for said first logical volume.

* * * * *

UNITED STATES PATENT AND TRADEMARK OFFICE
CERTIFICATE OF CORRECTION

PATENT NO. : 6,880,102 B1
DATED : April 12, 2005
INVENTOR(S) : William H. Bridge It is certified that error appears in the above-identified patent and that said Letters Patent is hereby corrected as shown below:

Column 39,
Line 55, delete "claim 81" and insert -- claim 87 --.

Signed and Sealed this

Fourteenth Day of June, 2005

JON W. DUDAS
*Director of the United States Patent and Trademark Office*